US010919260B2

(12) United States Patent
Cheng

(10) Patent No.: US 10,919,260 B2
(45) Date of Patent: Feb. 16, 2021

(54) COMPOSITE STRUCTURE HAVING A VARIABLE GAGE AND METHODS FOR FORMING A COMPOSITE STRUCTURE HAVING A VARIABLE GAGE

(71) Applicant: The Boeing Company, Chicago, IL (US)

(72) Inventor: Jiangtian Cheng, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/408,409

(22) Filed: May 9, 2019

(65) Prior Publication Data

US 2020/0353715 A1 Nov. 12, 2020

(51) Int. Cl.
*B32B 3/10* (2006.01)
*B32B 3/26* (2006.01)
(Continued)

(52) U.S. Cl.
CPC ............. *B32B 5/145* (2013.01); *B29C 70/10* (2013.01); *B29C 70/20* (2013.01); *B29C 70/202* (2013.01); *B29C 70/205* (2013.01); *B29C 70/30* (2013.01); *B32B 3/10* (2013.01); *B32B 5/12* (2013.01); *B32B 5/26* (2013.01); *B32B 5/28* (2013.01); *B29C 70/207* (2013.01); *B29C 70/54* (2013.01);
(Continued)

(58) Field of Classification Search
None
See application file for complete search history.

(56) References Cited

U.S. PATENT DOCUMENTS 4,177,306 A * 12/1979 Schulz ................. B29C 70/085
428/107
4,416,175 A * 11/1983 Bettner .................... B64C 1/06
83/29

(Continued)

FOREIGN PATENT DOCUMENTS

CN          104182641 A    * 12/2014
CN          104239952 A    * 12/2014
(Continued)

OTHER PUBLICATIONS

Kim et al., Practical design of tapered composite structures using the manufacturing cost concept, Mar. 2001, Composite Structures vol. 51, Issue 3, p. 285-299 (Year: 2001).*

(Continued)

*Primary Examiner* — Jeffrey A Vonch
(74) *Attorney, Agent, or Firm* — McDonnell Boehnen Hulbert Berghoff LLP

(57) ABSTRACT

In an example, a composite structure having a variable gage is described. The composite structure includes a first end having a first gage, a second end having a second gage, which is less than the first gage, a plurality of continuous plies, and a plurality of drop-off plies. Each continuous ply extends from the first end to the second end. Each drop-off ply includes a tip having a blunt-end shape. Each drop-off ply extends from the first end to a respective position of the tip of the drop-off ply between the first end and the second end. The plurality of drop-off plies are separated from each other by at least one of the plurality of continuous plies.

20 Claims, 14 Drawing Sheets

(51) Int. Cl.
  *B32B 5/12* (2006.01)
  *B32B 5/26* (2006.01)
  *B32B 5/28* (2006.01)
  *B29C 70/20* (2006.01)
  *B29C 70/30* (2006.01)
  *B32B 5/14* (2006.01)
  *B29C 70/10* (2006.01)
  *B64F 5/10* (2017.01)
  *B32B 1/00* (2006.01)
  *B32B 27/04* (2006.01)
  *B32B 5/02* (2006.01)
  *B32B 3/02* (2006.01)
  *B64C 3/18* (2006.01)
  *B64C 1/06* (2006.01)
  *B29L 31/30* (2006.01)
  *B29L 9/00* (2006.01)
  *B29C 70/54* (2006.01)

(52) U.S. Cl.
  CPC ...... *B29L 2009/00* (2013.01); *B29L 2009/001* (2013.01); *B29L 2031/3076* (2013.01); *B29L 2031/3082* (2013.01); *B29L 2031/3085* (2013.01); *B32B 1/00* (2013.01); *B32B 3/02* (2013.01); *B32B 5/022* (2013.01); *B32B 27/04* (2013.01); *B32B 2250/05* (2013.01); *B32B 2250/20* (2013.01); *B32B 2250/40* (2013.01); *B32B 2250/42* (2013.01); *B32B 2250/44* (2013.01); *B32B 2260/021* (2013.01); *B32B 2260/023* (2013.01); *B32B 2260/046* (2013.01); *B32B 2262/10* (2013.01); *B32B 2305/076* (2013.01); *B32B 2305/20* (2013.01); *B32B 2605/18* (2013.01); *B64C 1/064* (2013.01); *B64C 3/182* (2013.01); *B64F 5/10* (2017.01); *Y02T 50/40* (2013.01); *Y10T 428/2476* (2015.01); *Y10T 428/24612* (2015.01); *Y10T 428/24777* (2015.01); *Y10T 428/24995* (2015.04); *Y10T 428/249942* (2015.04)

(56) References Cited

U.S. PATENT DOCUMENTS

| | | | | |
|---|---|---|---|---|
| 4,606,961 | A * | 8/1986 | Munsen | B29C 70/08 428/105 |
| 4,966,802 | A * | 10/1990 | Hertzberg | B29D 99/0003 428/119 |
| 5,984,511 | A * | 11/1999 | Vasey-Glandon | G06F 30/00 703/6 |
| 6,017,484 | A | 1/2000 | Hale | |
| 6,173,925 | B1 * | 1/2001 | Mueller | B64C 3/48 244/123.1 |
| 6,372,072 | B1 * | 4/2002 | Healey | B32B 5/26 156/148 |
| 6,374,570 | B1 * | 4/2002 | McKague, Jr. | B64C 1/064 52/762 |
| 7,010,472 | B1 * | 3/2006 | Vasey-Glandon | G06F 30/00 703/6 |
| 7,238,409 | B1 * | 7/2007 | Peterson | B29C 66/12441 428/119 |
| 9,370,921 | B2 | 6/2016 | Butler et al. | |
| 9,463,864 | B1 * | 10/2016 | McCarville | B29D 99/0007 |
| 9,463,880 | B2 | 10/2016 | Vetter et al. | |
| 9,592,651 | B2 | 3/2017 | Deobald et al. | |
| 10,099,445 | B2 | 10/2018 | Kismarton | |
| 10,195,817 | B2 | 2/2019 | Balabanov et al. | |
| 2002/0031641 | A1 | 3/2002 | George et al. | |
| 2004/0161585 | A1 * | 8/2004 | Gaitonde | B64C 3/26 428/131 |
| 2005/0048246 | A1 | 3/2005 | Westre et al. | |
| 2005/0163975 | A1 * | 7/2005 | Chen | B29C 70/30 428/192 |
| 2007/0244590 | A1 * | 10/2007 | Menayo | B29C 70/54 700/98 |
| 2008/0145615 | A1 | 6/2008 | Jacobsen et al. | |
| 2008/0217806 | A1 | 9/2008 | Aijima | |
| 2008/0290214 | A1 | 11/2008 | Guzman et al. | |
| 2009/0022945 | A1 * | 1/2009 | Carpentier | G06F 30/3323 428/119 |
| 2009/0162613 | A1 * | 6/2009 | Valdegrama | B29C 70/34 428/156 |
| 2009/0176066 | A1 | 7/2009 | Darrow et al. | |
| 2009/0220747 | A1 * | 9/2009 | Karem | B32B 5/12 428/172 |
| 2009/0311462 | A1 * | 12/2009 | Goering | B29C 70/222 428/99 |
| 2010/0121625 | A1 * | 5/2010 | Krog | G06F 30/13 703/6 |
| 2010/0170985 | A1 * | 7/2010 | Flood | B29C 70/30 244/117 R |
| 2010/0170988 | A1 * | 7/2010 | Meyer | B64C 1/068 244/120 |
| 2010/0178453 | A1 * | 7/2010 | Wood | B29C 70/30 428/119 |
| 2010/0304094 | A1 * | 12/2010 | Brook | B64C 1/064 428/174 |
| 2011/0004451 | A1 * | 1/2011 | Krog | B29C 70/202 703/2 |
| 2011/0054850 | A1 * | 3/2011 | Roach | B29C 70/54 703/1 |
| 2011/0139932 | A1 * | 6/2011 | Matheson | B32B 5/26 244/132 |
| 2011/0143081 | A1 | 6/2011 | Fritz et al. | |
| 2011/0159242 | A1 * | 6/2011 | Arevalo Rodr Guez | B29D 99/0003 428/157 |
| 2011/0159244 | A1 * | 6/2011 | Mart Nez Valdegrama | B29C 70/30 428/172 |
| 2011/0250381 | A1 * | 10/2011 | Nyman | B29C 70/342 428/114 |
| 2012/0052247 | A1 * | 3/2012 | Pook | B29C 66/131 428/161 |
| 2012/0100343 | A1 * | 4/2012 | Borghini-Lilli | B29C 70/30 428/156 |
| 2012/0211607 | A1 | 8/2012 | Sanderson et al. | |
| 2012/0213640 | A1 * | 8/2012 | Sanderson | B64C 3/24 416/226 |
| 2012/0282430 | A1 * | 11/2012 | Lozano Garcia | B29C 70/30 428/77 |
| 2013/0101801 | A1 * | 4/2013 | Honorato Ruiz | B64C 1/064 428/167 |
| 2013/0103359 | A1 * | 4/2013 | Grandine | G06F 30/15 703/1 |
| 2013/0185924 | A1 * | 7/2013 | Bellanger | B24B 41/068 29/557 |
| 2013/0189482 | A1 | 7/2013 | Dequine | |
| 2013/0196121 | A1 * | 8/2013 | Beumler | B64C 1/12 428/189 |
| 2013/0344291 | A1 * | 12/2013 | Pearson | B29C 70/545 428/157 |
| 2014/0030478 | A1 | 1/2014 | Wittenberg | |
| 2014/0151507 | A1 * | 6/2014 | Woodard | B64C 3/26 244/133 |
| 2014/0166195 | A1 * | 6/2014 | Velten | B29B 11/16 156/212 |
| 2014/0186578 | A1 | 7/2014 | Outon Hernandez et al. | |
| 2015/0106062 | A1 * | 4/2015 | Chen-Keat | B29C 70/30 703/1 |
| 2015/0147529 | A1 * | 5/2015 | Bernadet | B64C 1/00 428/156 |
| 2015/0217850 | A1 * | 8/2015 | Tien | B29D 99/0014 428/121 |
| 2015/0314556 | A1 * | 11/2015 | Xie | B32B 5/12 428/113 |

(56) References Cited

U.S. PATENT DOCUMENTS

| | | | |
|---|---|---|---|
| 2016/0176500 A1* | 6/2016 | Ross | B64C 3/18 |
| | | | 428/157 |
| 2016/0193806 A1* | 7/2016 | Balabanov | G06F 30/20 |
| | | | 428/113 |
| 2017/0043859 A1* | 2/2017 | Autry | B32B 5/26 |
| 2017/0057615 A1* | 3/2017 | Charles | B32B 5/024 |
| 2017/0246830 A1* | 8/2017 | Deobald | B29D 99/0014 |
| 2018/0093431 A1* | 4/2018 | Forston | B32B 5/26 |
| 2018/0117873 A1 | 5/2018 | DuPont | |
| 2018/0194098 A1* | 7/2018 | Yoshikawa | B32B 37/10 |
| 2020/0139668 A1* | 5/2020 | Kashiwagi | B32B 5/26 |

FOREIGN PATENT DOCUMENTS

| | | | | |
|---|---|---|---|---|
| CN | 105005672 A | * | 10/2015 | |
| DE | 102008057708 A1 | * | 5/2010 | D04H 3/004 |
| EP | 0 905 509 | | 3/1999 | |
| EP | 1914383 | | 4/2008 | |
| JP | 04000530 U | * | 1/1992 | D04H 3/004 |

OTHER PUBLICATIONS

He et al., The study of tapered laminated composite structures: a review, Nov. 2000, Composites Science and Technology vol. 60, Issue 14, pp. 2643-2657 (Year: 2000).*

Mukherjee et al., Design guidelines for ply drop-off in laminated composite structures, 2001, Composites Part B: Engineering vol. 32, Issue 2, 2001, pp. 153-164 (Year: 2001).*

Liu et al., Structural design and global sensitivity analysis of the composite B-pillar with ply drop-off, Aug. 2017, Structural and Multidisciplinary Optimization, vol. 57, pp. 965-975 (Year: 2017).*

Murri et al., Tension Fatigue of Glass/Epoxy and Graphite/Epoxy Tapered Laminates, Jan. 1990, Journal of the American Helicopter Society, vol. 38 (Year: 1990).*

Cui et al, Abstract for Effect of step spacing on delamination of tapered laminates, 1994, Composites Science and Technology, vol. 52, Issue 1 (Year: 1994).*

Vizzini et al., Influence of Realistic Ply-Drop Geometries on Interlaminar Stresses in Tapered Laminates, 1995, Composite Materials: Fatigue and Fracture, vol. 5 (Year: 1995).*

Manne et al., Design Optimization of Composite Plates: Part II—Structural Optimization by Plydrop Tapering, Mar. 1998, Journal of Composite Materials, vol. 32, Issue 6 (Year: 1998).*

Kim et al., Practical design of tapered composite structures using the manufacturing cost concept, Mar. 2001, Composite Structures, vol. 51, Issue 3 (Year: 2001).*

Vidyashankar et al., Analysis of laminates with ply drops, Apr. 2001, Composites Science and Technology, vol. 61, Issue 5 (Year: 2001).*

Her, Stress analysis of ply drop-off in composite structures, Jul. 2002, Composite Structures, vol. 57, Issues 1-4 (Year: 2002).*

Steeves et al., Compressive strength of composite laminates with terminated internal plies, Jun. 2005, Composites Part A: Applied Science and Manufacturing, vol. 36, Issue 6 (Year: 2005).*

Khan et al., Suppression of Delamination at Ply Drops in Tapered Composites by Ply Chamfering, Jan. 2006, vol. 40, Issue 2 (Year: 2006).*

Murri et al., Fatigue life methodology for tapered hybrid composite flexbeams, Mar. 2006, Composites Science and Technology, vol. 66, Issues 3-4 (Year: 2006).*

Shim et al., Mechanisms and Structural Parameters Affecting the Interlaminar Stress Field in Laminates with Ply Drop-offs, Feb. 2006, Journal of Composite Materials, vol. 40, Issue 4 (Year: 2006).*

Allegri et al. On the optimization of tapered composite laminates in preliminary structural design, Dec. 2008, 17th International Conference on Composite Materials (Year: 2008).*

Weiss et al., Influence of ply-drop location on the fatigue behaviour of tapered composites laminates, Mar. 2010, Procedia Engineering, vol. 2, Issue 1 (Year: 2010).*

Dhurvey et al., Study the effect of externally and internally ply drop-off in composite laminate analysis, Dec. 2012 (Year: 2012).*

Dhurvey et al., Review on various studies of composite laminates with ply drop-off, Dec. 2012 (Year: 2012).*

Irisarri et al., Optimal design of laminated composite structures with ply drops using stacking sequence tables, Jan. 2014, Composite Structures, vol. 107 (Year: 2014).*

Peeters et al., Optimizing the ply dropping order in variable stiffness, variable thickness laminates using stacking sequence tables, Jun. 2016 (Year: 2016).*

Gan et al., A simplified layered beam approach for predicting ply drop delamination in thick composite laminates, Aug. 2016, Materials & Design, vol. 108 (Year: 2016).*

Homola et al., Fatigue behaviour of tailored blank thermoplastic composites with internal ply-drops, 2017, Procedia Structural Integrity, vol. 5 (Year: 2017).*

Celik et al., Maximization of Ultimate Strength of Unidirectional Tapered Composite Structures Considering Different Failure Modes, Jan. 2017, 58th AIAA/ASCE/AHS/ASC Structures, Structural Dynamics, and Materials Conference (Year: 2017).*

Rouhi et al., "Design, manufacturing, and testing of a variable stiffness composite cylinder", Composite Structures, vol. 184, at pp. 146-152, published Jan. 15, 2018, available at https://www.sciencedirect.com/science/article/pii/S0263822317326089.

Gürdal, et al., "Variable stiffness composite panels: Effects of stiffness variation on the in-plane and buckling response," Composites: Part A, vol. 39, Issue 5, at pp. 911-922, published May 2008, available at: https://ac.els-cdn.com/S1359835X07002643/1-s2.0-S1359835X07002643-main.pdf?_tid=d46d133d-59c5-42b9-89da-5a4dd999bffc&acdnat=1536620823_6c694b3e5c1e4e9d506206958d02fb6d (Abstract Only).

Co-pending U.S. Appl. No. 16/408,398, filed May 9, 2019.
Co-pending U.S. Appl. No. 16/408,401, filed May 9, 2019.
Co-pending U.S. Appl. No. 16/408,406, filed May 9, 2019.
Co-pending U.S. Appl. No. 16/408,408, filed May 9, 2019.
Co-pending U.S. Appl. No. 16/408,410, filed May 9, 2019.

Thawre et al., "Effect of Ply-Drop on Fatigue Life of a Carbon Fiber Composite under a Fighter Aircraft Spectrum Load Sequence", Composites Part B: Engineering, vol. 86, pp. 120-125, dated 2016.

Marmaras, Optimal Design of Composite Structures Under Manufacturing Constraints, 2014, Technical University of Denmark (2014).

Extended European Search Report prepared by the European Patent Office in application No. EP 20 17 3518.0 dated Sep. 17, 2020.

Extended European Search Report prepared by the European Patent Office in application No. EP 20 17 3521.4 dated Sep. 17, 2020.

* cited by examiner

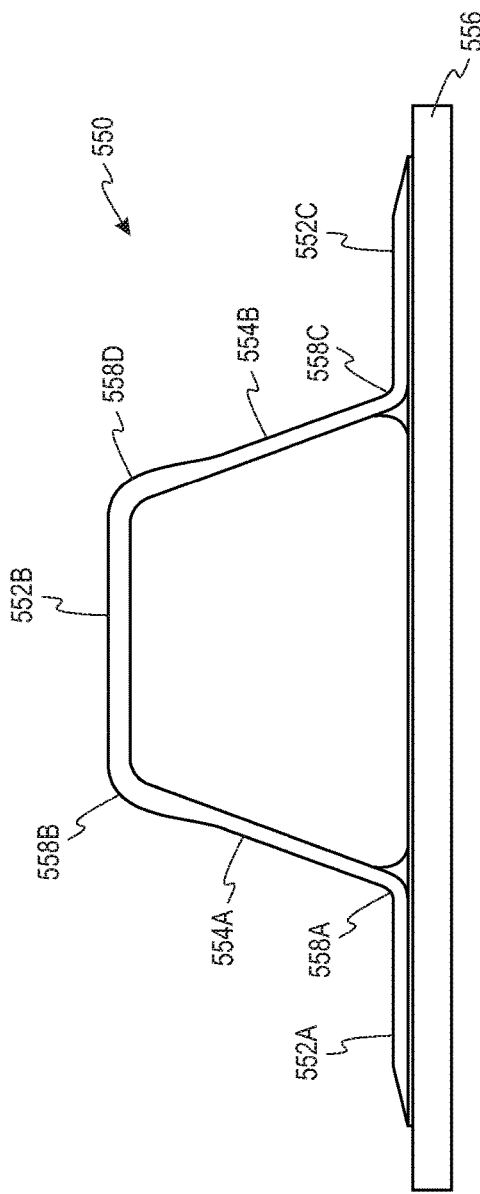
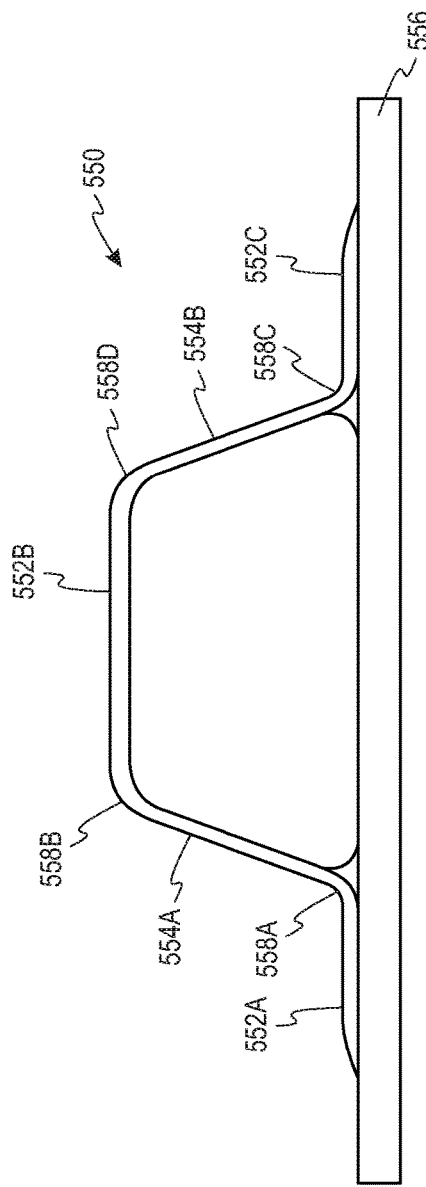

COMPOSITE STRUCTURE HAVING A VARIABLE GAGE AND METHODS FOR FORMING A COMPOSITE STRUCTURE HAVING A VARIABLE GAGE

FIELD

The present disclosure generally relates to composite structures and, more specifically, to composite structures and methods for forming composite structures having a variable gage.

BACKGROUND

Composite structures are used in a wide variety of applications, including in the manufacture of aircraft, spacecraft, rotorcraft, watercraft, automobiles, trucks, and other vehicles and structures, due to their high strength-to-weight ratios, corrosion resistance; and other favorable properties. In general, a composite structure is a structure that is formed from two or more constituent component materials with different physical and/or chemical properties that, when combined, produce a composite material having characteristics that are different than the characteristics of the individual components materials.

As an example, one type of composite material is carbon fiber reinforced plastic ("CFRP"). CFRP generally includes one or more composite layers or plies laminated together to form a sheet, laminate or layup. Each of the composite layers or plies can include a reinforcement material and a matrix material. The matrix material surrounds, binds and supports the reinforcement material. The reinforcement material provides structural strength to the matrix material and the CFRP. The matrix material is generally a non-conductive polymer such as an epoxy resin. The reinforcement material generally consists of strands of carbon fiber, which are electrically conductive.

SUMMARY

In an example, a composite structure having a variable gage is described. The composite structure includes a first end having a first gage, a second end having a second gage, which is less than the first gage, a plurality of continuous plies, and a plurality of drop-off plies. Each continuous ply extends from the first end to the second end. Each drop-off ply includes a tip having a blunt-end shape. Each drop-off ply extends from the first end to a respective position of the tip of the drop-off ply between the first end and the second end. The plurality of drop-off plies are separated from each other by at least one of the plurality of continuous plies.

In another example, a method of forming a composite structure having a variable gage is described. The method includes forming a plurality of continuous plies and forming a plurality of drop-off plies. Forming the plurality of drop-off plies includes forming, for each drop-off ply, a tip of the drop-off ply having a blunt-end shape. The method also includes positioning the plurality of continuous plies and the plurality of drop-off plies in a stack having a first end and a second end. The first end has a first gage, and the second end has a second gage, which is less than the first gage. Positioning the plurality of continuous plies and the plurality of drop-off plies includes (a) positioning the plurality of continuous plies such that each continuous ply extends from the first end to the second end, and (b) positioning the plurality of drop-off plies such that (i) each drop-off ply extends from the first end to a respective position of the tip of the drop-off ply between the first end and the second end, and (ii) the plurality of drop-off plies are separated from each other by at least one of the plurality of continuous plies.

In another example, a composite structure having a variable gage is described. The composite structure includes a first segment having a first gage, a second segment having a second gage, which is less than the first gage, and a transition segment between the first segment and the second segment. The transition segment includes a first end at the first segment and having the first gage, a second end at the second segment and having a second gage, a first outer surface extending from the first end to the second end, and a second outer surface extending from the first end to the second end. The transition segment also includes a plurality of plies (i) extending between the first end and the second end and (ii) arranged in a stack between the first outer surface and the second outer surface.

The plurality of plies include: (a) a plurality of continuous plies, wherein each continuous ply extends from the first end to the second end, and (b) at least one drop-off ply. Each drop-off ply includes a tip having a blunt-end shape. Each drop-off ply extends from the first end to a respective position of the tip of the drop-off ply between the first end and the second end. Each drop-off ply is sandwiched between and abuts against a respective two continuous plies of the plurality of continuous plies.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 5A depicts a side view of a composite stringer including the composite structure of FIG. 1, according to another example.

FIG. 5B depicts a side view of a composite stringer including the composite structure of FIG. 3, according to another example.

DETAILED DESCRIPTION

Figure 1:
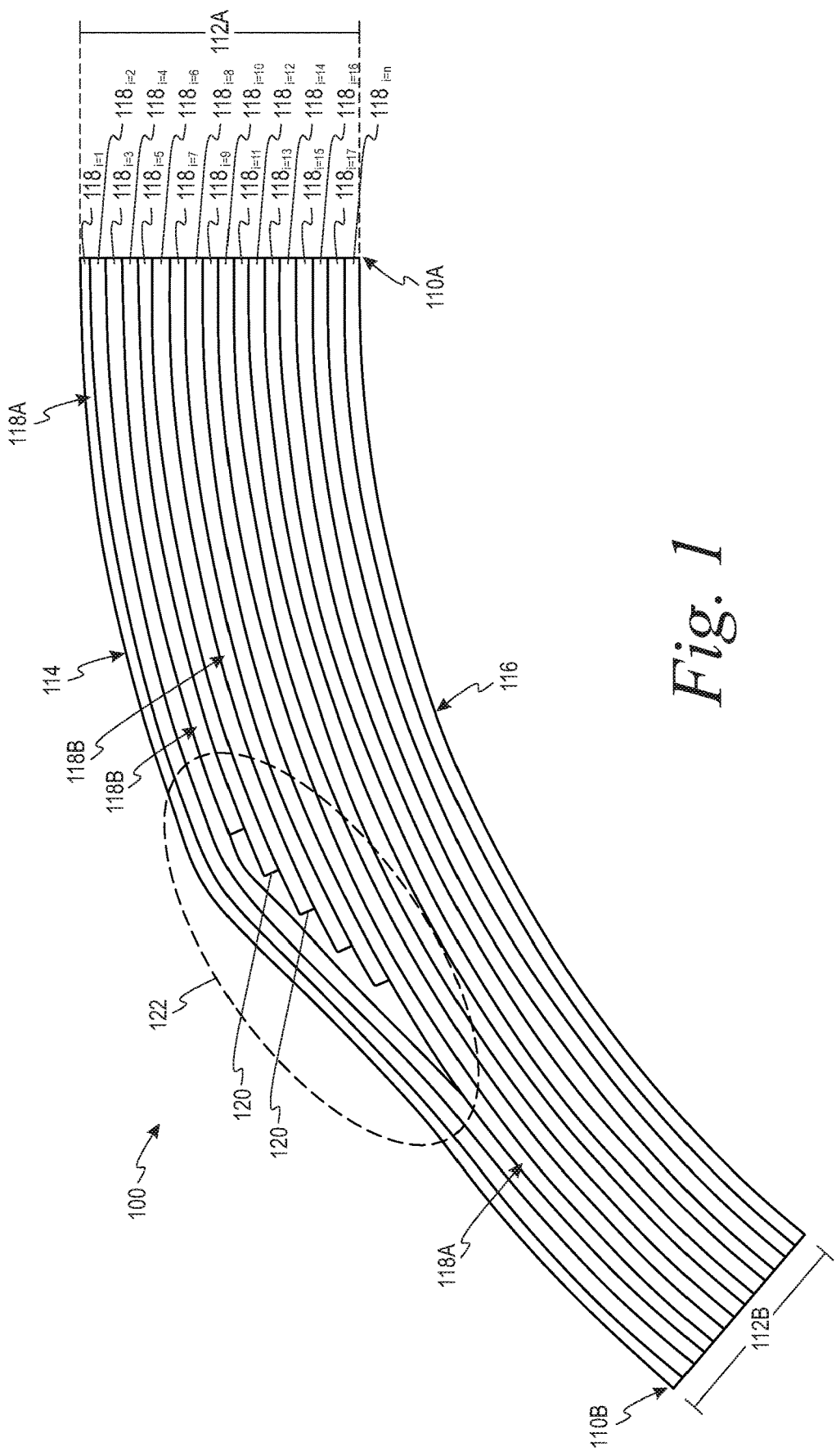
FIG. 1 depicts a composite structure, according to an example.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the term "approximately" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the terms "greater than" and "less than" are intended to have their common meaning. Thus, a first value is greater than a second value if the first value is greater than the second value by any amount. Similarly, a first value is less than a second value if the first value is less than the second value by any amount.

As used herein, the term "composite structure" means a structure that is manufactured, fabricated or assembled, in whole or in part, from one or more composite materials.

As noted above, a composite structure can be used in a wide variety of applications, including in the manufacture of aircraft, spacecraft, rotorcraft, watercraft, flying taxis, trains, automobiles, trucks, and other vehicles (e.g., passenger capsules or cargo container-) due to their high strength-to-weight ratios, corrosion resistance, and other favorable properties. Additionally or alternatively, a composite structure can be used in buildings, bridges, swimming pools, storage tanks, robotic frame structures, energy structures (e.g., wind blades, turbine blades, propulsion blades, and/or solar panels), sporting goods (e.g., bicycle frames, skis, snow boards, surfing boards, paddles), residential houses, office buildings, and/or medical board frames.

In some implementations, different portions of a composite structure may have different gages. As used herein, the term "gage" means a thickness between two opposing sides of the composite structure. It may be desirable to vary the gage from one portion of the composite structure relative to another portion of the composite structure for a variety of reasons. For example, a stiffness and/or a strength of the composite structure may be related to the gage of the composite structure. In some instances, it may be desirable to vary the stiffness and/or the strength of the composite structure from a first portion of the composite structure to a second portion of the composite structure. For instance, the first portion of the composite structure may be expected to experience a relatively greater amount of loading and/or applied force than the second portion of the composite structure. As such, it may be desirable for the first portion of the composite structure to have a gage that is greater than a gage of the second portion of the composite structure.

In other examples, it may be desirable to vary the gage of the composite structure additionally or alternatively based on other design criteria such as, for example, aesthetics, weight distribution, space constraints, load variation, and/or damage protection.

One approach to transitioning from one gage to another gage involves forming the composite structure from a plurality of plies of composite material, which include a plurality of continuous plies and one or more drop-off plies. In general, each continuous ply extends from a first end to a second end of the composite structure. By contrast, each drop-off ply extends from the first end to a respective position of a tip of the drop-off ply between the first end and the second end. In this arrangement, there are fewer plies at the second end relative to the first end. Thus, by positioning the tips of the drop-off plies between the first end and the second end, the gage decreases from the first end to the second end so as to transition from one gage to another gage.

Existing approaches to transitioning from one gage to another gage suffer from some drawbacks. For example, in existing composite structuring having a variable gage, the tips of the drop-off plies have a blunt-end shape and are arranged immediately adjacent to each other in a cluster. This can result in a relatively large resin pocket in a region at or near the tips of the drop-off plies. In some instances, the relatively large resin pocket may lead to delamination in the region under certain thermal and/or mechanical loads. Additionally, for example, arranging the tips of the drop-off plies in a cluster may increase a risk of ply kinks and/or wrinkles, which may reduce laminate strength.

As an example, FIG. 1 depicts an example composite structure 100 having a variable gage, according to an example. As shown in FIG. 1, the composite structure 100 includes a first end 110A having a first gage 112A and a second end 110B having a second gage 112B, which is less than the first gage 112A of the first end 110A. The composite structure 100 also includes a first outer surface 114 extending from the first end 110A to the second end 110B, and a second outer surface 116 extending from the first end 110A to the second end 110B.

As also shown in FIG. 1, the composite structure 100 includes a plurality of plies $118_{i=1}$ to $118_{i=n}$ of composite material (hereinafter collectively referred to as "plies $118_i$") arranged in a stack between the second outer surface 116 and the first outer surface 114, where n is an integer value that is greater than or equal to two. In FIG. 1, the composite structure 100 includes a total of 18 plies $118_i$ (i.e., n=18). However, in other examples, the composite structure 100 can include a lesser quantity or a greater quantity of plies $118_i$.

In this arrangement, the first gage 112A of the first end 110A and the second gage 112B of the second end 110B are respective thicknesses between the first outer surface 114 and the second outer surface 116 at the first end 110A and the second end 110B, respectively. Further, the first gage 112A is related to a quantity of the plies $118_i$ at the first end 110A and the second gage 112B is related to a quantity of the plies $118_i$ at the second end 110B. For instance, in FIG. 1, the quantity of the plies $118_i$ at the first end 110A is greater than the quantity of the plies $118_i$ at the second end 110B such that the first gage 112A is greater than the second gage 112B.

Specifically, to vary the quantity of the plies $118_i$ between the first end 110A and the second end 110B, the plies $118_i$ of composite material include a plurality of continuous plies 118A and a plurality of drop-off plies 118B. In FIG. 1, each continuous ply 118A extends from the first end 110A to the second end 110B. Whereas, each drop-off ply 118B includes a tip 120, and each drop-off ply 118B extends from the first end 110A to a respective position of the tip 120 of the drop-off ply 118B between the first end 110A and the second end 110B.

Accordingly, while the continuous plies 118A are present at the first end 110A and the second end 110B, the drop-off plies 118B are present at the first end 110A and absent at the second end 110B. In this way, the drop-off plies 118B can contribute to the first gage 112A at the first end 110A, whereas the drop-off plies 118B do not contribute to the second gage 112B at the second end 110B due to the drop-off plies 118B terminating prior to the second end 110B (i.e., the tips 120 being located at the respective positions between the first end 110A and the second end 110B).

For clarity of illustration, in FIG. 1, a representative subset of the continuous plies 118A are labeled with reference number 118A and a representative subset of the drop-off plies 118B are labeled with reference number 118B. However, each of the plies $118_i$ that extends entirely from the first end 110A to the second end 110B is one of the continuous plies 118A, and each of the plies $118_i$ that terminates between the first end 110A and the second end 110B is one of the drop-off plies 118B. Specifically, in FIG. 1, the plies $118_{i=1-3,\ 9-18}$ are the continuous plies 118A, and the plies $118_{i=4-8}$ are the drop-off plies 118B.

As shown in FIG. 1, the tip 120 of each drop-off ply 118B has a blunt-end shape, and the drop-off plies 118B are arranged immediately next to each other in the stack (e.g., in a cluster). In general, this approach to transitioning from one gage to another gage can be effective. However, it has been found that the performance of the composite structure 100 can be improved using one or more of the techniques described in detail below with respect to FIGS. 2-3.

For example, using drop-off plies 118B with blunt-end shaped tips 120 and/or arranging the drop-off plies 118B in a cluster can result in a relatively large resin pocket in a region 122 at or near the tips 120 of the drop-off plies 118B. In some instances, the relatively large resin pocket in the region 122 may lead to delamination in the region 122 under certain thermal and/or mechanical loads. Additionally, for example, arranging the tips 120 of the drop-off plies 118B in a cluster may increase a risk of ply kinks and/or wrinkles, which may reduce laminate strength. Further, in some instances, arranging the tips 120 of the drop-off plies at an off-center location (e.g., closer to the first outer surface 114 than the second outer surface 116) can also increase a risk of ply kinks and/or wrinkles, which can have a reduced static strength and/or a reduced fatigue strength due to potential distortion under thermal and/or mechanical loads.

Within examples, composite structures having variable gages are described, which can improve upon the composite structure 100 in one or more respects. For instance, in some examples, the tips 120 of the drop-off plies 118B can have a tapered shape and/or the plies $118_i$ can be arranged according to one or more patterns that can, among other things, enhance the load bearing properties of a composite structure, reduce re-curing, simplify tooling requirements for forming the composite structure, reduce material handling costs, and/or reduce a weight of the composite structure.

Figure 2:
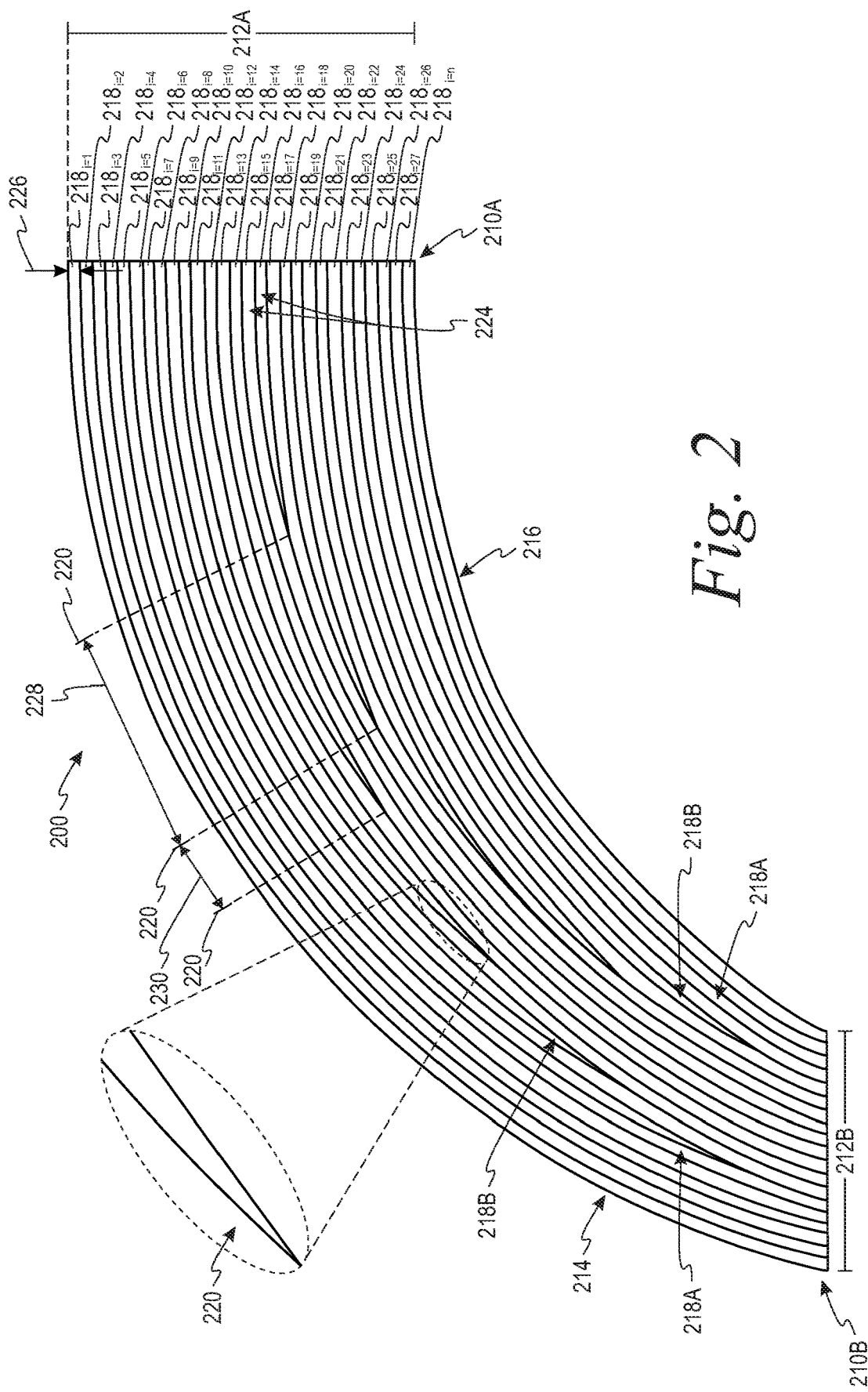
FIG. 2 depicts a composite structure, according to another example.

Referring now to FIG. 2, a composite structure 200 having a variable gage is depicted according to an example. As shown in FIG. 2, the composite structure 200 includes a first end 210A having a first gage 212A and a second end 210B having a second gage 212B, which is less than the first gage 212A of the first end 210A. Additionally, as shown in FIG. 2, the composite structure 200 includes a first outer surface 214 extending from the first end 210A to the second end 210B, and a second outer surface 216 extending from the first end 210A to the second end 210B.

As also shown in FIG. 2, the composite structure 200 includes a plurality of plies $218_{i=1}$ to $218_{i=n}$ of composite material (hereinafter collectively referred to as "plies $218_i$") arranged in a stack between the second outer surface 216 and the first outer surface 214, where n is an integer value that is greater than or equal to two. In FIG. 2, the composite structure 200 includes a total of 28 plies $218_i$ (i.e., n=28). However, in other examples, the composite structure 200 can include a lesser quantity or a greater quantity of plies $218_i$.

In this arrangement, the first gage 212A of the first end 210A and the second gage 212B of the second end 210B are respective thicknesses between the first outer surface 214 and the second outer surface 216 at the first end 210A and the second end 210B, respectively. Further, as described above, the first gage 212A is related to a quantity of the plies $218_i$ at the first end 210A and the second gage 212B is related to a quantity of the plies $218_i$ at the second end 210B. For instance, in FIG. 2, the quantity of the plies $218_i$ at the first end 210A is greater than the quantity of the plies $218_i$ at the second end 210B such that the first gage 212A is greater than the second gage 212B.

As described above, the variable gage of the composite structure 200 results from the plies $218_i$ of composite material including a plurality of continuous plies 218A and a plurality of drop-off plies 218B arranged in the stack between the second outer surface 216 and the first outer surface 214. In FIG. 2, each continuous ply 218A extends from the first end 210A to the second end 210B. Whereas, each drop-off ply 218B extends from the first end 210A to a respective position of a tip 220 of the drop-off ply 218B between the first end 210A and the second end 210B. Thus, the first gage 212A is based on a quantity of the continuous plies 218A and a quantity of the drop-off plies 218B, and the second gage 212B is based on the quantity of the continuous plies 218A (and not the quantity of the drop-off plies 218B).

For clarity of illustration, in FIG. 2, a representative subset of the continuous plies 218A are labeled with reference number 218A and a representative subset of the drop-off plies 218B are labeled with reference number 218B. However, each of the plies $218_i$ that extends entirely from the first end 210A to the second end 210B is one of the continuous plies 218A, and each of the plies $218_i$ that terminates between the first end 210A and the second end 210B is one of the drop-off plies 218B. Specifically, in FIG. 2, the plies $218_{i=1\text{-}6,\ 8,\ 10,\ 12,\ 14,\ 15,\ 17,\ 19,\ 21,\ 23,\ 25\text{-}28}$ are the continuous plies 218A, and the plies $218_{1=7,\ 9,\ 11,\ 13,\ 16,\ 18,\ 20,\ 22,\ 24}$ are the drop-off plies 218B.

As shown in FIG. 2, the tip 220 of each drop-off ply 218B has a tapered shape. More particularly, for example, the tip 220 of each drop-off ply 218B can gradually reduce in thickness in a direction along the tip 220 from the first end 210A toward the second end 210B. Because the tip 220 has the tapered shape, the tip 220 can more closely abut against adjacent ones of the plies $218_i$ (e.g., as compared to the blunt-end shaped tips 120 in FIG. 1, which terminate relatively abruptly). As such, the tips 220 having the tapered shape can reduce (or may minimize) resin pockets at the tips 220 of the drop-off plies 218B, which can help to improve (or may maximize) interlaminar strength of the composite structure 200. Accordingly, the tapered shape of the tips 220 of the drop-off plies 218B can help to improve a load bearing performance of the composite structure 200 having the variable gage for transitioning from a section having the first gage 212A to a section having the second gage 212B.

Within examples, the tapered shape of the tips 220 of the drop-off plies 218B can be formed by cutting each drop-off ply 218B at an angle less than approximately 85 degrees relative to a longitudinal axis of the drop-off ply 218B. By contrast, the blunt-end shape of the tips 120 of the drop-off plies 118B shown in FIG. 1 can be formed, for example, by cutting each drop-off ply 118B at an angle of approximately 90 degrees relative to a longitudinal axis of the drop-off ply 118B.

As noted above, the load bearing performance of the composite structure 200 can be enhanced, additionally or alternatively, based on a pattern in which the plies $218_i$ are arranged in the composite structure 200. For example, in FIG. 2, the drop-off plies 218B are separated from each other by at least one of the continuous plies 218A. More particularly, in FIG. 2, each drop-off ply 218B is sandwiched between and abuts against a respective two continuous plies 218A of the plurality of continuous plies 218A. By separating the drop-off plies 218B from each other and/or sandwiching the drop-off plies 218B between the continuous plies 218A, the drop-off plies 218B can be more uniformly distributed between the second outer surface 216 and the first outer surface 214 (as compared to the clustered arrangement of the drop-off plies 118B shown in FIG. 1). This can help to reduce (or may prevent) ply kinks and/or wrinkles, reduce (or may prevent) resin pockets, and/or increase (or may maximize) interlaminar strength of the composite structure 200.

As noted above, in FIG. 2, the plies $218_{i=1\text{-}6,\ 8,\ 10,\ 12,\ 14,\ 15,\ 17,\ 19,\ 21,\ 23,\ 25\text{-}28}$ are the continuous plies 218A, and the plies $218_{i=7,\ 9,\ 11,\ 13,\ 16,\ 18,\ 20,\ 22,\ 24}$ are the drop-off plies 218B. Accordingly, in FIG. 2, each of the plies $218_{i=7,\ 9,\ 11,\ 13,\ 16,\ 18,\ 20,\ 22,\ 24}$ is separated from each other by at least one of the plies $218_{i=1\text{-}6,\ 8,\ 10,\ 12,\ 14,\ 15,\ 17,\ 19,\ 21,\ 23,\ 25\text{-}28}$, and each of the plies $218_{i=7,\ 9,\ 11,\ 13,\ 16,\ 18,\ 20,\ 22,\ 24}$ is sandwiched between and abuts against a respective two of the plies $218_{i=1\text{-}6,\ 8,\ 10,\ 12,\ 14,\ 15,\ 17,\ 19,\ 21,\ 23,\ 25\text{-}28}$. For instance, in FIG. 2, the ply $218_{i=7}$ is separated from the ply $218_{i=9}$ by the ply $218_{i=8}$, and the ply $218_{i=7}$ is sandwiched between the ply $218_{i=6}$ and the ply $218_{i=8}$. Additionally, for instance, the ply $218_{i=9}$ is separated from the ply $218_{i=11}$ by the ply $218_{i=10}$, separated from the ply $218_{i=9}$ by the ply $218_{i=8}$, and sandwiched between the ply $218_{i=8}$ and the ply $218_{i=10}$. Further, for instance, the ply $218_{i=16}$ is separated from the ply $218_{i=13}$ by the plies $218_{i=14,\ 15}$, separated from the ply $218_{i=18}$ by the ply $218_{i=17}$, and sandwiched between the ply $218_{i=15}$ and the ply $218_{i=17}$. Similar relationships exist for a remainder of the drop-off plies 218B in FIG. 2 (i.e., the plies $218_{i=11,\ 13,\ 18,\ 20,\ 22,\ 24}$). As noted above, arranging the plies $218_i$ in a pattern having a characteristic of the drop-off plies 218B interleaved with the continuous plies 218A (e.g., as shown in FIG. 2) can help to reduce (or may prevent) ply kinks and/or wrinkles, reduce (or may prevent) resin pockets, and/or increase (or may maximize) interlaminar strength of the composite structure 200.

Within examples, the pattern of the tips 220 of the drop-off plies 218B can additionally or alternatively include one or more of the following characteristics: (i) an arrangement of the tips 220 in a first half of the composite structure 200 in a pattern that substantially mirrors or mirrors a pattern of the tips 220 in a second half of the composite structure 200, (ii) a staggered arrangement of the tips 220 relative to each other, and/or (iii) spacing the tips 220 relative to each other by at least one threshold distance (e.g., at least one distance related to respective positions and/or respective thicknesses of one or more of the plies 218). Each of these characteristics alone or in combination can contribute to arranging the drop-off plies 218B in a pattern that can reduce (or may prevent) ply kinks and/or wrinkles, reduce (or may prevent) resin pockets, and/or increase (or may maximize) interlaminar strength.

FIG. 2 shows the tips 220 arranged in substantially mirror or mirror patterns relative to a central portion 224 of the composite structure 200 according to one example. The central portion 224 can include one or more of the plies $218_i$ that provide a frame of reference for characterizing patterns of the tips 220 of the drop-off plies 218B on opposing sides of the central portion 224. In general, the central portion 224 (i) is between the second outer surface 216 and the first outer surface 214 and (ii) extends from the first end 210A to the second end 210B.

In FIG. 2, the central portion 224 can include the plies $218_{i=15,\ 16}$. Thus, in FIG. 2, the central portion 224 can include a single drop-off ply 218B (i.e., the ply $218_{i=16}$) and a single continuous ply 218A (i.e., the ply $218_{i=15}$). However, in another example, the central portion 224 can include two drop-off plies 218B and at least one continuous ply 218A. In yet another example, the central portion 224 can consist of only a single drop-off ply 218B. In another example, the central portion 224 can consist of one or more continuous plies 218A and omit the drop-off plies 218B. More generally, the central portion 224 can include one or more of the continuous plies 218A and/or one or more of the drop-off plies 218B.

As noted above, the tips 220 of the drop-off plies 218B can be arranged in substantially mirror or mirror patterns relative to the central portion 224. For instance, a first subset of the drop-off plies 218B can be between the first outer surface 214 and the central portion 224, and a second subset of the drop-off plies 218B can be between the central portion 224 and the second outer surface 216. In this arrangement, the tips 220 of the first subset of the drop-off plies 218B are arranged in a pattern that substantially mirrors a pattern of the tips 220 of the second subset of the drop-off plies 218B. In other words, with reference to the central portion 224, the respective positions of the tips 220 of the first subset of the drop-off plies 218B are (i) reversely and (ii) similarly (or identically) arranged in comparison to the respective positions of the tips 220 of the second subset of the drop-off plies 218B.

For example, in FIG. 2, the central portion 224 can include the plies $218_{i=15, 16}$, the first subset of the drop-off plies 218B can include the plies $218_{i=7, 9, 11, 13}$, and the second subset of the drop-off plies 218B can include the plies $218_{i=18, 20, 22, 24}$. As shown in FIG. 2, the pattern of the tips 220 of the first subset of the drop-off plies 218B substantially mirrors the pattern of the tips 220 of the second subset of the drop-off plies 218B. For instance, with reference to the central portion 224, the respective positions of the tips 220 of the first subset are reversely and similarly arranged in comparison to the respective positions of the tips 220 of the second subset.

Additionally, as shown in FIG. 2, the pattern of the tips 220 of the drop-off plies 218B can be a monotonically-outward pattern. For instance, in FIG. 2, the first subset of the drop-off plies 218B can be in an order from a drop-off ply 218B closest to the central portion 224 (e.g., the ply $218_{i=13}$) to a drop-off ply 218B closest to the first outer surface 214 (i.e., the ply $218_{i=7}$). The pattern of the tips 220 of the first subset of the drop-off plies 218B can include, with each successive drop-off ply 218B in the order, a relative distance between the tip 220 of the drop-off ply 218B and the second end 210B decreases. As such, in FIG. 2, (i) the tip 220 of the ply $218_{i=13}$ is at a first distance from the second end 210B, (ii) the tip 220 of the ply $218_{i=11}$ is at a second distance from the second end 210B, which is less than the first distance, (iii) the tip 220 of the ply $218_{i=9}$ is at a third distance from the second end 210B, which is less than the second distance, and (iv) the tip 220 of the ply $218_{i=7}$ is at a fourth distance from the second end 210B, which is less than the third distance.

Similarly, the second subset of the drop-off plies 218B can be in an order from a drop-off ply 218B closest to the central portion 224 (e.g., the ply $218_{i=18}$) to a drop-off ply 218B closest to the second outer surface 216 (e.g., the ply $218_{i=24}$). The pattern of the tips 220 of the second subset of the drop-off plies 218B includes, with each successive drop-off ply 218B in the order, a relative distance between the tip 220 of the drop-off ply 218B and the second end 210B decreases. As such, in FIG. 2, (v) the tip 220 of the ply $218_{i=18}$ is at a fifth distance from the second end 210B, (vi) the tip 220 of the ply $218_{i=20}$ is at a sixth distance from the second end 210B, which is less than the fifth distance, (vii) the tip 220 of the ply $218_{i=22}$ is at a seventh distance from the second end 210B, which is less than the sixth distance, and (viii) the tip 220 of the ply $218_{i=24}$ is at an eighth distance from the second end 210B, which is less than the seventh distance.

Accordingly, in the monotonically-outward pattern of the tips 220 shown in FIG. 2, the tips 220 of the drop-off plies 218B generally appear to be spread outward from the central portion 224 in a direction from the first end 210A to the second end 210B. The monotonically-outward pattern of the tips 220 can help to more gradually and/or smoothly transition from the first gage 212A at the first end 210A to the second gage 212B at the second end 210B. Additionally, for example, the monotonically-outward pattern of the tips 220 can help to achieve a relatively greater degree of symmetry relative to, for instance, the arrangement of the tips 120 in FIG. 1 (which are clustered near the first outer surface 114).

According to an additional or alternative aspect of the monotonically-outward pattern shown in FIG. 2, the drop-off plies 218B can be arranged in a plurality of pairs of drop-off plies 218B that define an order in which the drop-off plies 218B drop off in a direction from the first end 210A toward the second end 210B (i.e., an order of the respective positions of the tips 220 in the direction from the first end 210A toward the second end 210B). In particular, each pair of drop-off plies 218B can include a respective one drop-off ply 218B of the first subset and a respective one drop-off ply 218B of the second subset.

For example, in FIG. 2, a first pair includes the plies $218_{i=13, 18}$, a second pair includes the plies $218_{i=11, 20}$, a third pair includes the plies $218_{i=9, 22}$, and a fourth pair includes the plies $218_{i=7, 24}$. As shown in FIG. 2, in the direction from the first end 210A to the second end 210B, the drop-off plies 218B drop off in an order from the first pair to the fourth pair. In other words, the tips 220 of the first pair of the drop-off plies 218B are closest to the first end 210A, the tips 220 of the second pair of the drop-off plies 218B are second closest to the first end 210A, the tips 220 of the third pair of the drop-off plies 218B are third closest to the first end 210A, and the tips 220 of the fourth pair of the drop-off plies 218B are farthest from the first end 210A.

Additionally, for example, for each pair of drop-off plies 218B, the respective one drop-off ply 218B of the first subset and the respective one drop-off ply 218B of the second subset can be substantially equidistant from the central portion 224 in a dimension between the first outer surface 214 and the second outer surface 216. For instance, as shown in FIG. 2, the first pair of the drop-off plies 218B are each spaced from the central portion 224 by a distance equal to a ply thickness 226 of a single ply $218_i$, the second pair of the drop-off plies 218B are each spaced from the central portion 224 by a distance equal to three times the ply thickness 226, the third pair of the drop-off plies 218B are each spaced from the central portion 224 by a distance equal to five times the ply thickness 226, and the fourth pair of the drop-off plies 218B are each spaced from the central portion 224 by a distance equal to seven times the ply thickness 226. Arranging the drop-off plies 218B in pairs that (i) drop off, pair-by-pair, in an order from the first end 210A to the second end 210B, and/or (ii) are equidistant relative to the central portion 224 can additionally help to more gradually and/or smoothly transition from the first gage 212A at the first end 210A to the second gage 212B at the second end 210B, and/or achieve a relatively greater degree of symmetry relative to, for instance, the arrangement of the tips 120 in FIG. 1 (which are clustered near the first outer surface 114).

Within examples, each drop-off ply 218B can have a ply angle, relative to a longitudinal axis of the composite structure 200 (e.g., the longitudinal axis 348), which is between approximately −30 degrees and +30 degrees. This can help to achieve a desired stiffness with a relatively few (or minimal) quantity of plies $218_i$ and, thus, reduce (or may minimize) a weight and/or cost of fabricating the composite structure 200. In an example, for each pair, the ply angle is approximately the same for the drop-off plies 218B of the pair. This can help to improve (or may maximize) a symmetry of the composite structure 200.

According to an additional or alternative aspect of the monotonically-outward pattern shown in FIG. 2, the monotonically-outward pattern can include, along a direction from the first end 210A to the second end 210B, the tips 220 of the first subset of the drop-off plies 218B alternating with the tips 220 of the second subset of the drop-off plies 218B. For example, in FIG. 2, the tips 220 of the drop-off plies 218B are in the following order from the first end 210A to the second end 210B: (i) the tip 220 of the ply $218_{i=18}$ from the second subset, (ii) the tip 220 of the ply $218_{i=13}$ from the first subset, (iii) the tip 220 of the ply $218_{i=20}$ from the second subset, (iv) the tip 220 of the ply $218_{i=11}$ from the first subset, (v) the tip 220 of the ply $218_{i=22}$ from the second subset, (vi) the tip 220 of the ply $218_{i=9}$ from the first subset, (vii) the tip 220 of the ply $218_{i=24}$ from the second subset, and (viii) the tip 220 of the ply $218_{i=7}$ from the first subset. Alternating the respective positions of the tips 220 of the drop-off plies 218B can additionally or alternatively help to help to more gradually and/or smoothly transition from the first gage 212A at the first end 210A to the second gage 212B at the second end 210B.

As noted above, arranging the drop-off plies 218B such that the tips 220 of the drop-off plies 218B are staggered relative to each other can additionally or alternatively help to reduce (or may prevent) ply kinks and/or wrinkles, reduce (or may prevent) resin pockets, and/or increase (or may maximize) interlaminar strength. As an example, in FIG. 2, the respective positions of the tips 220 of the drop-off plies 218B can be staggered from the first end 210A to the second end 210B. By "staggered", it is meant that the tips 220 of the drop-off plies 218B are each at a respective distance from the second end 210B, and the respective distances between the tips 220 and the second end 210B are all different from each other (i.e., the tips of no two drop-off plies are equidistant from the second end 210B). Staggering the tips 220 of the drop-off plies 218B can help to mitigate some or all of the challenges associated with a clustered arrangement of drop-off plies described above.

Also, as noted above, spacing the tips 220 relative to each other by at least one threshold distance can additionally or alternatively help to reduce (or may prevent) ply kinks and/or wrinkles, reduce (or may prevent) resin pockets, and/or increase (or may maximize) interlaminar strength. In an example, for each drop-off ply 218B, a distance 228 between the tip 220 of the drop-off ply 218B and the tip 220 of an adjacent one of the drop-off plies 218B can be at least ten times greater than the ply thickness 226 of the drop-off ply 218B. In this example, for each drop-off ply 218B, the adjacent one of the drop-off plies 218B is adjacent to the drop-off ply 218B in a dimension extending between the first outer surface 214 and the second outer surface 216. That is, two of the drop-off plies 218B are adjacent to each other only if there is not another one of the drop-off plies 218B between the two of the drop-off plies 218B in the dimension extending between the first outer surface 214 and the second outer surface 216. Thus, for example, the ply $218_{i=18}$ is adjacent to the ply $218_{i=16}$ and the ply $218_{i=20}$, and non-adjacent to the other drop-off plies 218B (i.e., plies $218_{i=7, 9, 11, 13, 22, 24}$).

A representative one of the distances 228 is depicted in FIG. 2 between the tips 220 of the ply $218_{i=18}$ and the ply $218_{i=16}$, which are adjacent to each other. As shown in FIG. 2, the distance 228 between the tip 220 of the ply $218_{i=18}$ and the tip of the ply $218_{i=16}$ is at least ten times greater than the ply thickness 226 of the ply $218_{i=18}$. Similarly, in FIG. 2, the tips 220 of the other adjacent ones of the drop-off plies 218B are separated by respective distances 228 that are at least ten times greater than the ply thickness 226. As described above, arranging the drop-off plies 218B such that the tips 220 of adjacent ones of the drop-off plies 218B are separated by the distance 228 of at least ten times the ply thickness 226 can help to reduce (or may prevent) ply kinks and/or wrinkles, reduce (or may prevent) resin pockets, and/or increase (or may maximize) interlaminar strength.

Additionally or alternatively, for example, a distance 230 between non-adjacent ones of the drop-off plies 218B can be at least three times greater than the ply thickness 226 of each drop-off ply 218B. A representative one of the distances 230 is depicted in FIG. 2 between the tips 220 of the ply $218_{i=18}$ and the ply $218_{i=13}$, which are non-adjacent to each other (e.g., because the ply $218_{i=16}$ is between the ply $218_{i=18}$ and the ply $218_{i=13}$). As shown in FIG. 2, the distance 230 between the tip 220 of the ply $218_{i=18}$ and the tip of the ply $218_{i=13}$ is at least three times greater than the ply thickness 226 of the ply $218_{i=18}$. Similarly, the tips 220 of the other non-adjacent ones of the drop-off plies 218B are separated by respective distances 230 that are at least three times greater than the ply thickness 226. As described above, arranging the drop-off plies 218B such that the tips 220 of non-adjacent ones of the drop-off plies 218B are separated by the distance 228 of at least three times the ply thickness 226 can help to reduce (or may prevent) ply kinks and/or wrinkles, reduce (or may prevent) resin pockets, and/or increase (or may maximize) interlaminar strength.

In FIG. 2, the ply thickness 226 is the same for all of the plies $218_i$. However, in another example, one or more of the plies $218_i$ can have a different ply thickness than another one of the plies $218_i$. In some implementations, providing the plies $218_i$ with different ply thicknesses can help to provide relatively greater flexibility for achieving fabrication quality objectives.

Additionally, in FIG. 2, the tips 220 of the drop-off plies 218B all have the tapered shape. However, in another example, one or more of the tips 220 of the drop-off plies 218B can have the blunt-end shape shown in FIG. 1. Although the tapered shape can be beneficial for at least the reasons described above, a composite structure including the drop-off plies 218B having the tips 120 with the blunt-end shape in a pattern having one or more of the characteristics described above with respect to FIG. 2 can provide improvements over the composite structure 100 shown in FIG. 1. Similarly, a composite structure including the drop-off plies 118B arranged in the pattern shown in FIG. 1, but with the tips 220 having the tapered shape can provide improvements over the composite structure 100 shown in FIG. 1. Accordingly, within examples, the drop-off plies 118B, 218B can the tips 220 with the tapered shape and/or the tips 120 with the blunt-end shape, and the drop-off plies 118B, 218B can be arranged in a clustered pattern (as shown in FIG. 1) and/or a pattern having one or more of the characteristics described above with respect to FIG. 2.

As described, arranging the tips 220 of the drop-off plies 218B in a pattern having one or more of the characteristics described above can help to achieve a relatively greater degree of symmetry for the composite structure 200 (e.g., about the central portion 224) relative to, for instance, the arrangement of the tips 120 in FIG. 1. As used herein, the term "symmetry" is intended to be a relative term and does not mean exactly symmetric. For example, as shown in FIG. 2, the composite structure 200 includes 14 plies $218_i$ between the central portion 224 and the first outer surface 214, and 12 plies $218_i$ between the central portion 224 and the second outer surface 216. However, in the context of this disclosure, the composite structure 200 shown in FIG. 2 has a greater degree of symmetry relative to the composite structure 100 shown in FIG. 1.

Within examples, providing the composite structure 200 with a relatively greater degree of symmetry about the central portion 224 can help to increase (or may maximize) interlaminar strength. Additionally or alternatively, providing the composite structure 200 with a relatively greater degree of symmetry about the central portion 224 can help to reduce (or may minimize) re-curing, tooling, material handling costs, and/or weight.

As described above, FIG. 2 shows the composite structure 200 with the drop-off plies 218B arranged in an example pattern having one or more characteristics that can help to improve performance, reduce re-curing, reduce tooling, reduce material handling costs, and/or reduce a weight of the composite structure 200. Other example patterns having the one or more characteristics are also possible.

Figure 3:
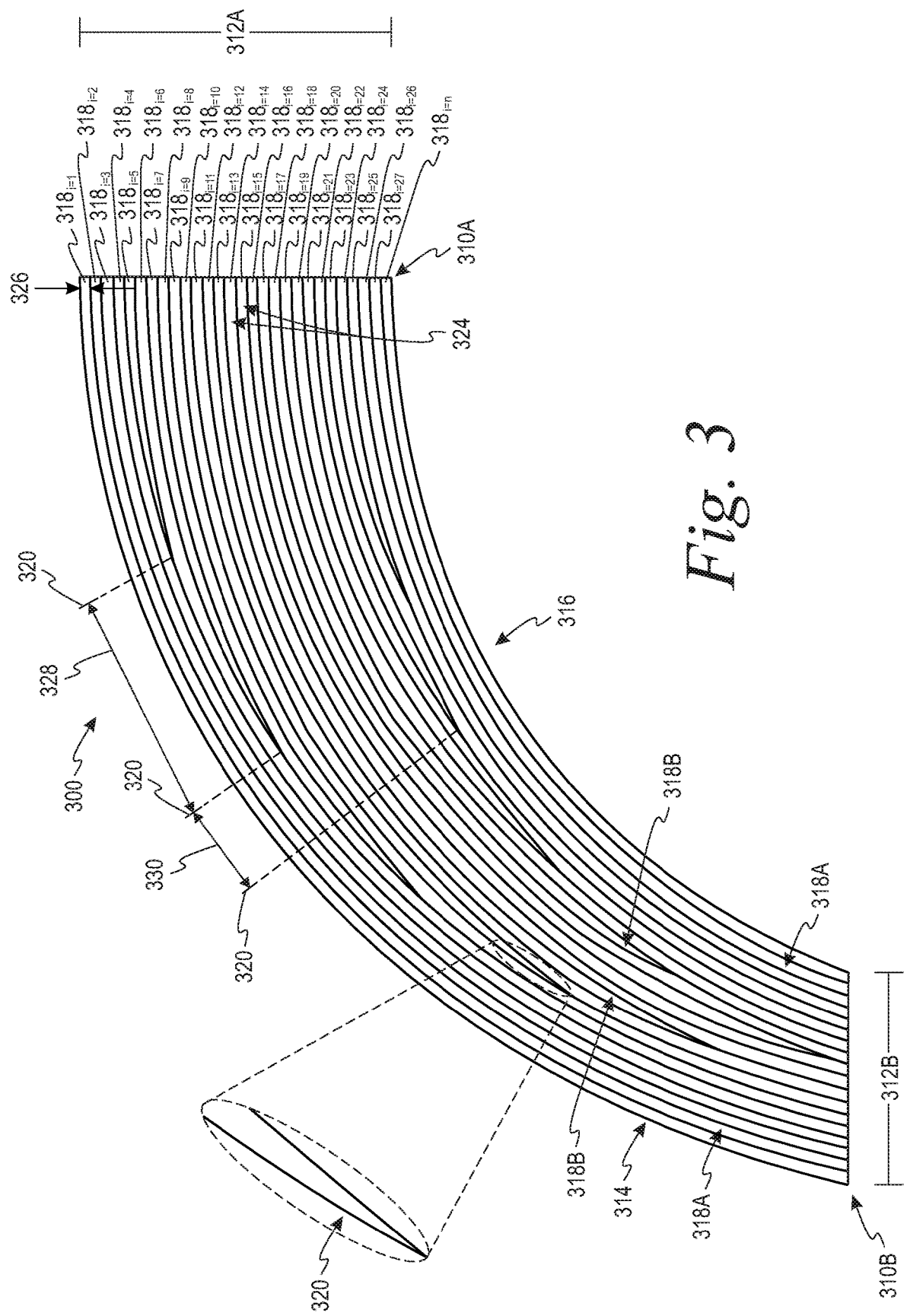
FIG. 3 depicts a composite structure, according to another example.

For instance, FIG. 3 shows a composite structure 300 having a variable gage according to another example. As shown in FIG. 3, the composite structure 300 includes a first end 310A having a first gage 312A and a second end 310B having a second gage 312B, which is less than the first gage 312A of the first end 310A. Additionally, as shown in FIG. 3, the composite structure 300 includes a first outer surface 314 extending from the first end 310A to the second end 310B, and a second outer surface 316 extending from the first end 310A to the second end 310B.

As also shown in FIG. 3, the composite structure 300 includes a plurality of plies $318_{i=1}$ to $318_{i=n}$ of composite material (hereinafter collectively referred to as "plies $318_i$") arranged in a stack between the second outer surface 316 and the first outer surface 314, where n is an integer value that is greater than or equal to two. In FIG. 3, the composite structure 300 includes a total of 28 plies $318_i$ (i.e., n=28). However, in other examples, the composite structure 300 can include a lesser quantity or a greater quantity of plies $318_i$.

In this arrangement, the first gage 312A of the first end 310A and the second gage 312B of the second end 310B are respective thicknesses between the second outer surface 316 and the first outer surface 314 at the first end 310A and the second end 310B, respectively. Further, the first gage 312A is related to a quantity of the plies $318_i$ at the first end 310A and the second gage 312B is related to a quantity of the plies $318_i$ at the second end 310B. For instance, in FIG. 3, the quantity of the plies $318_i$ at the first end 310A is greater than the quantity of the plies $318_i$ at the second end 310B such that the first gage 312A is greater than the second gage 312B.

As described above, the variable gage of the composite structure 300 results from the plies $318_i$ of composite material including a plurality of continuous plies 318A and a plurality of drop-off plies 318B arranged in the stack between the second outer surface 316 and the first outer surface 314. In FIG. 3, each continuous ply 318A extends from the first end 310A to the second end 310B. Whereas, each drop-off ply 318B includes a tip 320, and each drop-off ply 318B extends from the first end 310A to a respective position of the tip 320 of the drop-off ply 318B between the first end 310A and the second end 310B.

For clarity of illustration, in FIG. 3, a representative subset of the continuous plies 318A are labeled with reference number 318A and a representative subset of the drop-off plies 318B are labeled with reference number 318B. However, each of the plies $318_i$ that extends entirely from the first end 310A to the second end 310B is one of the continuous plies 318A, and each of the plies $318_i$ that terminates between the first end 310A and the second end 310B is one of the drop-off plies 318B. Specifically, in FIG. 3, the plies $318_{i=1-4,6,8,10,12,14,15,17,19,21,23,25-28}$ are the continuous plies 318A, and the plies $318_{i=5,7,9,11,13,16,18,20,22,24}$ are the drop-off plies 318B.

As shown in FIG. 3, the tip 320 of each drop-off ply 318B has the tapered shape described above with respect to the tips 220 shown in FIG. 2. As such, the tips 320 having the tapered shape can reduce (or may minimize) resin pockets at the tips 320 of the drop-off plies 318B, which can help to improve (or may maximize) interlaminar strength of the composite structure 300. However, in other examples, one or more of the drop-off plies 318B can have the blunt-end shape shown in FIG. 1.

As noted above, the load bearing performance of the composite structure 300 can be enhanced, additionally or alternatively, based on the pattern in which the plies $318_i$ are arranged in the composite structure 300. For example, in FIG. 3, the drop-off plies 218B can be separated from each other by at least one of the continuous plies 318A. For instance, each drop-off ply 318B can be sandwiched between and abut against a respective two continuous plies 318A of the plurality of continuous plies 318A. By separating the drop-off plies 318B from each other and/or sandwiching the drop-off plies 318B between the continuous plies 318A, the drop-off plies 318B can be more uniformly distributed between the second outer surface 316 and the first outer surface 314 (as compared to the clustered arrangement of the drop-off plies 118B shown in FIG. 1). This can help to reduce (or may prevent) ply kinks and/or wrinkles, reduce (or may prevent) resin pockets, and/or increase (or may maximize) interlaminar strength of the composite structure 300.

Within examples, the pattern of the tips 320 of the drop-off plies 218B can additionally or alternatively include one or more of the following characteristics: (i) an arrangement of the tips 320 in a first half of the composite structure 300 in a pattern that mirrors a pattern of the tips 320 in a second half of the composite structure 300, (ii) a staggered arrangement of the tips 320 relative to each other, and/or (iii) spacing the tips 320 relative to each other by at least one threshold distance. As described above, each of these characteristics alone or in combination can contribute to arranging the drop-off plies 318B in a pattern that can reduce (or may prevent) ply kinks and/or wrinkles, may reduce (or may prevent) resin pockets, and/or increase (or may maximize) interlaminar strength.

FIG. 3 shows the tips 320 arranged in mirror patterns relative to a central portion 324 of the composite structure 300 according to another example. The central portion 324 can include one or more of the plies $318_i$ that provide a frame of reference for characterizing patterns of the tips 320 of the drop-off plies 318B on opposing sides of the central portion 324. As noted above, in general, the central portion 324 (i) is between the second outer surface 316 and the first outer surface 314 and (ii) extends from the first end 310A to the second end 310B.

In FIG. 3, the central portion 324 can include the plies $318_{i=14, 15}$. Thus, in FIG. 3, the central portion 324 can include two continuous plies 318A. However, in another example, the central portion 324 can include two drop-off plies 318B and at least one continuous ply 318A. In yet another example, the central portion 324 can consist of only a single drop-off ply 318B. In another example, the central portion 324 can consist of at least one continuous ply 318A and omit the drop-off plies 318B. More generally, the central portion 324 can include one or more of the continuous plies 318A and/or one or more of the drop-off plies 318B.

Also, as shown in FIG. 3, the tips 320 of the drop-off plies 318B can be arranged in substantially mirror or mirror patterns relative to the central portion 324. For instance, a first subset of the drop-off plies 318B can be between the first outer surface 314 and the central portion 324, and a second subset of the drop-off plies 318B can be between the central portion 324 and the second outer surface 316. In this arrangement, the tips 320 of the first subset of the drop-off plies 318B are arranged in a pattern that substantially mirrors a pattern of the tips 320 of the second subset of the drop-off plies 318B. In other words, with reference to the central portion 324, the respective positions of the tips 320 of the first subset of the drop-off plies 318B are (i) reversely and (ii) similarly (or identically) arranged in comparison to the respective positions of the tips 320 of the second subset of the drop-off plies 318B.

For example, in FIG. 3, the central portion 324 can include the plies $318_{i=14, 15}$, the first subset of the drop-off plies 318B can include the plies $318_{i=5, 7, 9, 11, 13}$, and the second subset of the drop-off plies 318B can include the plies $318_{i=16, 18, 20, 22, 24}$. As shown in FIG. 3, the pattern of the tips 320 of the first subset of the drop-off plies 318B substantially mirrors the pattern of the tips 320 of the second subset of the drop-off plies 318B. For instance, with reference to the central portion 324, the respective positions of the tips 320 of the first subset are reversely and similarly arranged in comparison to the respective positions of the tips 320 of the second subset.

As described above, FIG. 2 shows the pattern of the tips 220 of the drop-off plies 218B as a monotonically-outward pattern. FIG. 3 shows the tips 320 of the drop-off plies 318B arranged in a monotonically-inward pattern, according to an example. In a first order of the first subset of the drop-off plies 318B from the first outer surface 314 toward the central portion 324, with each successive drop-off ply 318B in the first order, a relative distance between the tip 320 of the drop-off ply 318B and the second end 310B decreases. Also, in a second order of the second subset of the drop-off plies 318B from the second outer surface 316 toward the central portion 324, with each successive drop-off ply 318B in the second order, a relative distance between the tip 320 of the drop-off ply 318B and the second end 310B decreases.

As such, in FIG. 3, (i) the tip 320 of the ply $218_{i=5}$ is at a first distance from the second end 310B, (ii) the tip 320 of the ply $318_{i=7}$ is at a second distance from the second end 310B, which is less than the first distance, (iii) the tip 320 of the ply $318_{i=9}$ is at a third distance from the second end 310B, which is less than the second distance, (iv) the tip 320 of the ply $318_{i=11}$ is at a fourth distance from the second end 310B, which is less than the third distance, and (v) the tip 320 of the ply $318_{i=13}$ is at a fifth distance from the second end 310B, which is less than the fourth distance. Also, in FIG. 3, (vi) the tip 320 of the ply $318_{i=24}$ is at a sixth distance from the second end 310B, (vii) the tip 320 of the ply $318_{i=22}$ is at a seventh distance from the second end 310B, which is less than the sixth distance, (viii) the tip 320 of the ply $318_{i=20}$ is at an eighth distance from the second end 310B, which is less than the seventh distance, (ix) the tip 320 of the ply $318_{i=18}$ is at a ninth distance from the second end 310B, which is less than the eighth distance, and (x) the tip 320 of the ply $318_{i=16}$ is at a tenth distance from the second end 310B, which is less than the ninth distance.

Accordingly, in the monotonically-inward pattern of the tips 320 shown in FIG. 3, the tips 320 of the drop-off plies 318B generally appear to be converge inward from the first outer surface 314 and the second outer surface 316 toward the central portion 324 in a direction from the first end 310A to the second end 310B. The monotonically-inward pattern of the tips 320 can help to more gradually and/or smoothly transition from the first gage 312A at the first end 310A to the second gage 312B at the second end 310B. Additionally, for example, the monotonically-inward pattern of the tips 320 can help to achieve a relatively greater degree of symmetry relative to, for instance, the arrangement of the tips 120 in FIG. 1 (which are clustered near the first outer surface 114).

According to an additional or alternative aspect of the monotonically-inward pattern shown in FIG. 3, the drop-off plies 318B can be arranged in a plurality of pairs of drop-off plies 318B that define an order in which the drop-off plies 318B drop off in a direction from the first end 310A toward the second end 310B (i.e., an order of the respective positions of the tips 320 in the direction from the first end 310A toward the second end 310B). In particular, each pair of drop-off plies 318B can include a respective one drop-off ply 318B of the first subset and a respective one drop-off ply 318B of the second subset.

For example, in FIG. 3, a first pair includes the plies $318_{i=5, 24}$, a second pair includes the plies $318_{i=7, 22}$, a third pair includes the plies $318_{i=9, 20}$, a fourth pair includes the plies $318_{i=11, 18}$, and a fifth pair includes the plies $318_{i=13, 16}$. As shown in FIG. 3, in the direction from the first end 310A to the second end 310B, the drop-off plies 318B drop off in an order from the first pair to the fifth pair. In other words, the tips 320 of the first pair of the drop-off plies 318B are closest to the first end 310A, the tips 320 of the second pair of the drop-off plies 318B are second closest to the first end 310A, the tips 320 of the third pair of the drop-off plies 318B are third closest to the first end 310A, the tips 320 of the fourth pair of the drop-off plies 318B are second farthest from the first end 310A, and the tips 320 of the fifth pair of the drop-off plies 318B are farthest from the first end 310A.

Additionally, for example, for each pair of drop-off plies 318B, the respective one drop-off ply 318B of the first subset and the respective one drop-off ply 318B of the second subset can be equidistant from the central portion 324 in a dimension between the first outer surface 314 and the second outer surface 316. For instance, as shown in FIG. 3, the first pair of the drop-off plies 318B are each spaced from the central portion 324 by a distance equal to eight times a ply thickness 326 of a single ply $318_i$, the second pair of the drop-off plies 318B are each spaced from the central portion 324 by a distance equal to six times the ply thickness 326, the third pair of the drop-off plies 318B are each spaced from the central portion 324 by a distance equal to four times the ply thickness 326, the fourth pair of the drop-off plies 318B are each spaced from the central portion 324 by a distance equal to two times the ply thickness 326, and the fifth pair of the drop-off plies 318B are each immediately adjacent to and abut against the central portion 324. Arranging the drop-off plies 318B in pairs that (i) drop off, pair-by-pair, in an order from the first end 310A to the second end 310B, and/or (ii) are equidistant relative to the central portion 324 can additionally help to more gradually and/or smoothly transition from the first gage 312A at the first end 310A to the second gage 312B at the second end 310B, and/or achieve a relatively greater degree of symmetry relative to, for instance, the arrangement of the tips 120 in FIG. 1 (which are clustered near the first outer surface 114).

According to an additional or alternative aspect of the monotonically-inward pattern shown in FIG. 3, the mono-tonically-inward pattern can include, along a direction from the first end 310A to the second end 310B, the tips 320 of the first subset of the drop-off plies 318B alternating with the tips 320 of the second subset of the drop-off plies 318B. For example, in FIG. 3, the tips 320 of the drop-off plies 318B are in the following order from the first end 310A to the second end 310B: (i) the tip 320 of the ply $318_{i=5}$ from the first subset, (ii) the tip 320 of the ply $318_{i=24}$ from the second subset, (iii) the tip 320 of the ply $318_{i=7}$ from the first subset, (iv) the tip 320 of the ply $318_{i=22}$ from the second subset, (v) the tip 320 of the ply $318_{i=9}$ from the first subset, (vi) the tip 320 of the ply $318_{i=20}$ from the second subset, (vii) the tip 320 of the ply $318_{i=11}$ from the first subset, (viii) the tip 320 of the ply $318_{i=18}$ from the second subset, (ix) the tip 320 of the ply $318_{i=13}$ from the first subset, and (x) the tip 320 of the ply $318_{i=16}$ from the second subset. Alternating the respective positions of the tips 320 of the drop-off plies 318B can additionally or alternatively help to help to more gradually and/or smoothly transition from the first gage 312A at the first end 310A to the second gage 312B at the second end 310B.

As noted above, arranging the drop-off plies 318B such that the tips 320 of the drop-off plies 318B are staggered relative to each other can additionally or alternatively help to reduce (or may prevent) ply kinks and/or wrinkles, reduce (or may prevent) resin pockets, and/or increase (or may maximize) interlaminar strength. As an example, in FIG. 3, the respective positions of the tips 320 of the drop-off plies 318B can be staggered from the first end 310A to the second end 310B. By "staggered", it is meant that the tips 320 of the drop-off plies 318B are each at a respective distance from the second end 310B, and the respective distances between the tips 320 and the second end 310B are all different from each other (i.e., the tips of no two drop-off plies are equidistant from the second end 310B). Staggering the tips 320 of the drop-off plies 318B can help to mitigate some or all of the challenges associated with a clustered arrangement of drop-off plies described above.

Also, as noted above, spacing the tips 320 relative to each other by at least one threshold distance can additionally or alternatively help to reduce (or may prevent) ply kinks and/or wrinkles, reduce (or may prevent) resin pockets, and/or increase (or may maximize) interlaminar strength. In an example, for each drop-off ply 318B, a distance 328 between the tip 320 of the drop-off ply 318B and the tip 320 of an adjacent one of the drop-off plies 318B can be at least ten times greater than the ply thickness 326 of the drop-off ply 318B. In this example, for each drop-off ply 318B, the adjacent one of the drop-off plies 318B is adjacent to the drop-off ply 318B in a dimension extending between the first outer surface 314 and the second outer surface 316. For instance, as described above, two of the drop-off plies 318B are adjacent to each other only if there is not another one of the drop-off plies 318B between the two of the drop-off plies 318B in the dimension extending between the first outer surface 314 and the second outer surface 316. Thus, for example, the ply $318_{i=7}$ is adjacent to the ply $318_{i=5}$ and the ply $318_{i=9}$, and non-adjacent to the other drop-off plies 318B (i.e., plies $218_{i=n, 13, 16, 18, 20, 22, 24}$).

A representative one of the distances 328 is depicted in FIG. 3 between the tips 320 of the ply $318_{i=7}$ and the ply $318_{i=5}$, which are adjacent to each other. As shown in FIG. 3, the distance 328 between the tip 320 of the ply $318_{i=7}$ and the tip of the ply $318_{i=5}$ is at least ten times greater than the ply thickness 326 of the ply $318_{i=7}$. Similarly, in FIG. 3, the tips 320 of the other adjacent ones of the drop-off plies 318B are separated by respective distances 328 that are at least ten times greater than the ply thickness 326. As described above, arranging the drop-off plies 318B such that the tips 320 of adjacent ones of the drop-off plies 318B are separated by the distance 328 of at least ten times the ply thickness 326 can help to reduce (or may prevent) ply kinks and/or wrinkles, reduce (or may prevent) resin pockets, and/or increase (or may maximize) interlaminar strength.

Additionally or alternatively, for example, a distance 330 between non-adjacent ones of the drop-off plies 318B can be at least three times greater than the ply thickness 326 of each drop-off ply 318B. A representative one of the distances 330 is depicted in FIG. 3 between the tips 320 of the ply $318_{i=7}$ and the ply $318_{i=22}$, which are non-adjacent to each other (e.g., because the plies $318_{i=9, 11, 13, 16, 18, 20}$ are between the ply $318_{i=7}$ and the ply $318_{i=22}$). As shown in FIG. 3, the distance 330 between the tip 320 of the ply $318_{i=7}$ and the tip of the ply $318_{i=22}$ is at least three times greater than the ply thickness 326 of the ply $318_{i=7}$. Similarly, the tips 320 of the other non-adjacent ones of the drop-off plies 318B are separated by respective distances 330 that are at least three times greater than the ply thickness 326. As described above, arranging the drop-off plies 318B such that the tips 320 of non-adjacent ones of the drop-off plies 318B are separated by the distance 328 of at least three times the ply thickness 326 can help to reduce (or may prevent) ply kinks and/or wrinkles, reduce (or may prevent) resin pockets, and/or increase (or may maximize) interlaminar strength.

In FIG. 3, the ply thickness 326 is the same for all of the plies $318_i$. However, in another example, one or more of the plies $318_i$ can have a different ply thickness than another one of the plies $318_i$. In some implementations, providing the plies $318_i$ with different ply thicknesses can help to provide relatively greater flexibility for achieving fabrication quality objectives.

Additionally, in FIG. 3, the tips 320 of the drop-off plies 318B all have the tapered shape. However, in another example, one or more of the tips 320 of the drop-off plies 318B can have the blunt-end shape of the tips 120 shown in FIG. 1. Although the tapered shape can be beneficial for at least the reasons described above, a composite structure including the drop-off plies 318B having the tips 120 with the blunt-end shape in a pattern having one or more of the characteristics described above with respect to FIG. 3 can provide improvements over the composite structure 100 shown in FIG. 1.

In FIGS. 1-3, the composite structures 100, 200, 300 are shown having a shape that curves between the first end 110A, 210A, 310A and the second end 110B, 210B, 310B. However, in other examples, the composite structures 100, 200, 300 can have a different shape such as, for example, a planar shape, a scalloped shape, a corrugated shape, a uniform shape, a non-uniform shape, a polygonal shape, and/or a non-polygonal shape.

In some examples, the first end 110A, 210A, 310A and/or the second end 110B, 210B, 310B can form external surfaces of the composite structure 100, 200, 300. However, in other examples, the first end 110A, 210A, 310A and/or the second end 110B, 210B, 310B can be respective interfaces with other segments of a larger composite structure. For instance, the composite structure 100, 200, 300 shown in FIGS. 1-3 can provide a transition segment of a composite structure for transitioning from one gage to another gage within the composite structure.

Figure 4:
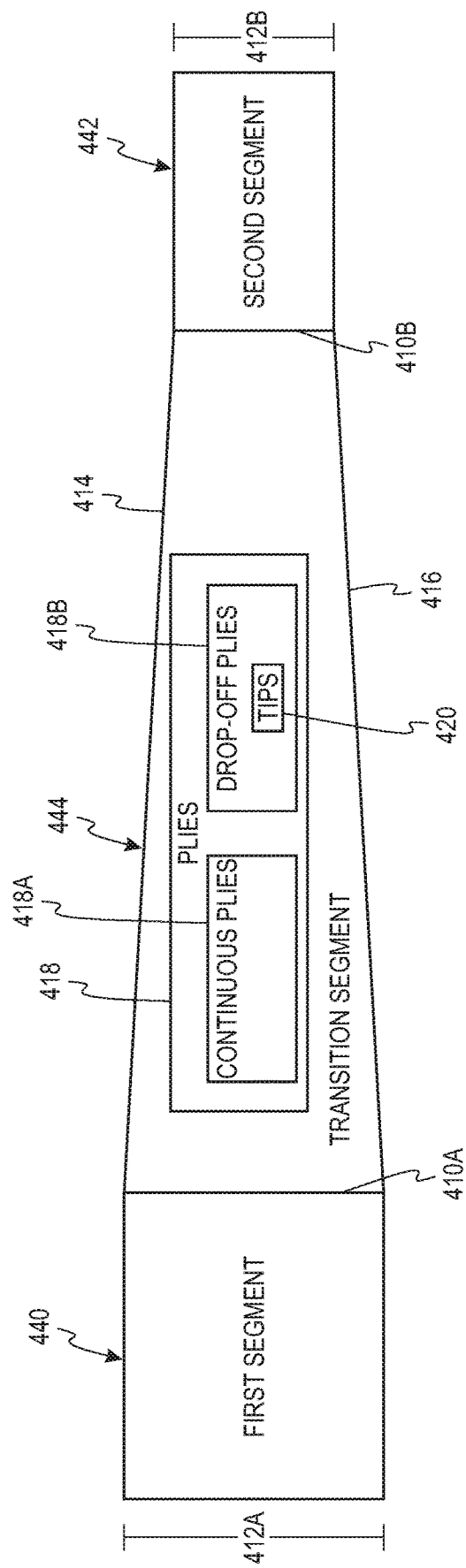
FIG. 4 depicts a simplified block diagram of a composite structure, according to another example.

Referring to FIG. 4, a simplified block diagram of a composite structure 400 having a variable gage is shown, according to another example. As shown in FIG. 4, the composite structure 400 includes a first segment 440, a second segment 442, and a transition segment 444 between the first segment 440 and the second segment 442. The first segment 440 has a first gage 412A and the second segment 442 has a second gage 412B, which is less than the first gage 412A. Although FIG. 4 depicts the composite structure 400 having three segments (i.e., the first segment 440, a transition segment 444, and a second segment 442), the composite structure 400 can include a lesser quantity or a greater quantity of segments in other examples.

The transition segment 444 can have a variable gage for transitioning from between the first gage 412A and the second gage 412B. For example, the transition segment 444 can include one or more continuous plies and one or more drop-off plies, which are configured to transition between the first gage 412A and the second gage 412B as described above with respect to the composite structures 100, 200, 300 shown in FIGS. 1-3.

For instance, as shown in FIG. 4, the transition segment 444 includes a first end 410A at the first segment 440 and having the first gage 412A, a second end 410B at the second segment 442 and having a second gage 412B, a first outer surface 414 extending from the first end 410A to the second end 410B, a second outer surface 416 extending from the first end 410A to the second end 410B. The first end 410A can thus provide an interface between the first segment 440 and the transition segment 444, and the second end 410B can provide an interface between the second segment 442 and the transition segment 444.

The transition segment 444 also includes a plurality of plies 418 (i) extending between the first end 410A and the second end 410B and (ii) arranged in a stack between the first outer surface 414 and the second outer surface 416. As shown in FIG. 4, the plies 418 include a plurality of continuous plies 418A and at least one drop-off ply 418B. As described above, each continuous ply 418A extends from the first end 410A to the second end 410B, each drop-off ply 418B includes a tip 420, and each drop-off ply 418B extends from the first end 410A to a respective position of the tip 420 of the drop-off ply 418B between the first end 410A and the second end 410B. Within examples, the tips 420 of the drop-off plies 418B can have a tapered shape (e.g., as shown in FIGS. 2-3) and/or a blunt-end shape (e.g., as shown in FIG. 1).

In some examples, each drop-off ply 418B is sandwiched between and abuts against a respective two continuous plies 418A of the plurality of continuous plies 418A. Additionally or alternatively, the tips 420 of the drop-off plies 418B can be arranged in a monotonically-outward pattern (e.g., as shown in FIG. 2), a monotonically-inward pattern (e.g., as shown in FIG. 3), a staggered pattern (e.g., as shown in FIGS. 2-3), and/or a substantially mirrored pattern (e.g., as shown in FIGS. 2-3) as described above.

For instance, in an implementation in which the tips 420 are arranged in the monotonically-inward pattern, (i) a first subset of the drop-off plies 418B are between the first outer surface 414 and a central portion of the stack and a second subset of the drop-off plies 418B are between the central portion and the second outer surface 416, (ii) in a first order of the first subset of the drop-off plies 418B from the first outer surface 414 toward the central portion, with each successive drop-off ply 418B in the first order, a relative distance between the tip 420 of the drop-off ply 418B and the second end 410B decreases, and (iii) in a second order of the second subset of the drop-off plies 418B from the second outer surface 416 toward the central portion, with each successive drop-off ply 418B in the second order, a relative distance between the tip 420 of the drop-off ply 418B and the second end 410B decreases.

Additionally, for instance, in an implementation in which the tips 420 are arranged in the monotonically-outward pattern, (i) a first subset of the drop-off plies 418B are between the first outer surface 414 and a central portion of the stack and a second subset of the drop-off plies 418B are between the central portion and the second outer surface 416, (ii) in a first order of the first subset of the drop-off plies 418B from the central portion toward the first outer surface 414, with each successive drop-off ply 418B in the first order, a relative distance between the tip 420 of the drop-off ply 418B and the second end 410B decreases, and (iii) in a second order of the second subset of the drop-off plies 418B from the central portion toward the second outer surface 416, with each successive drop-off ply 418B in the second order, a relative distance between the tip 420 of the drop-off ply 418B and the second end 410B decreases.

Additionally or alternatively, for each drop-off ply 418B, a distance between the tip 420 of the drop-off ply 418B and the tip 420 of an adjacent one of the drop-off plies 418B can be at least ten times greater than a thickness of the drop-off ply 418B. Additionally or alternatively, a distance between non-adjacent ones of the drop-off plies 418B can be at least three times greater than a thickness of each drop-off ply 418B.

Within examples, the composite structures 100, 200, 300, 400 described above with respect to FIGS. 1-4 can be used to form a variety of structures. As examples, an aircraft, a spacecraft, a rotorcraft, a watercraft, an automobile, a truck, and/or another type of vehicle (e.g., passenger capsules or cargo containers) can include the composite structures 100, 200, 300, 400 described above. Additionally, for example, a building, a bridge, a swimming pool, a storage tank, robotic frame structures, energy structures (e.g., wind blades, turbine blades, propulsion blades, and/or solar panels), sporting goods (e.g., bicycle frames, skis, snow boards, surfing boards, paddles), residential houses, office buildings, and/or medical board frames can include the composite structures 100, 200, 300, 400 described above.

As one example, FIGS. 5A-5B depict composite stringers 550 that can include one or more of the composite structures 100, 200, 300, 400 described above with respect to FIGS. 1-4. In general, the composite stringers 550 are each an elongate member that can be coupled to one or more skin panels to help carry and/or transfer a load from the skin panel to another structure of the aircraft (e.g., a frame, a rib, and/or a spar of the aircraft). In this way, the composite stringers 550 can help to prevent buckling under compression or shear loads on the skin panels, and/or mitigate bending of the skin panels. For these and other reasons, the aircraft typically includes one or more composite stringers 550 in a fuselage, wing assemblies, and/or an empennage of the aircraft.

In general, the composite stringer 550 includes one or more flanges 552A-552C and one or more webs 554A-554B. More particularly, in FIGS. 5A-5B, the composite stringer 550 includes a skin flange 552A configured to be coupled to the support structure 556 (e.g., a skin panel of an aircraft), a top flange 552B, and a web 554A extending between the skin flange 552A and the top flange 552B. In FIG. 5, the composite stringer 550 is in the form of a hat-shaped stringer. As such, the web 554A can extend from a first side of the top flange 550B, and the composite stringer 550 can further include a second skin flange 552C configured to be coupled to the support structure 556 and a second web 554B extending between the second skin flange 552C and a second side of the top flange 552B.

Within examples, the composite stringer 550 can further include one or more corner portions, which each provides a transition segment between two other segments of the composite stringer 550 (i.e., between two of the skin flange 552A, the web 554A, the top flange 552B, the second web 554B, and the second skin flange 552C). For instance, in FIG. 5, the corner portion(s) of the composite stringer 550 can include (i) a first corner portion 558A extending from the skin flange 552A to the web 554A, (ii) an second corner portion 558B extending from the web 554A to the top flange 552B, (iii) a third corner portion 558C extending from the second skin flange 552C to the second web 554B, and/or (iv) a fourth corner portion 558D extending from the second web 554B to the top flange 552B.

Also, in FIG. 5, the top flange 552B has a first gage 512A. The skin flange 552A, the second skin flange 552C, the web 554A, and the second web 554B all have a second gage 512B. In this example, the first gage 512A is greater than the second gage 512B.

In this arrangement, the second corner portion 558B and the fourth corner portion 558D can be a composite structure having a variable gage. For instance, the top flange 552B can be a first segment (e.g., the first segment 440), the web 554A can be a second segment (e.g., the second segment 442 in FIG. 4), and the second corner portion 558B can be a transition segment (e.g., the transition segment 444 in FIG. 4) between the top flange 552B and the web 554A. Similarly, for instance, the top flange 552B can be a first segment (e.g., the first segment 440), the second web 554B can be a second segment (e.g., the second segment 442 in FIG. 4), and the fourth corner portion 558D can be a transition segment (e.g., the transition segment 444 in FIG. 4) between the top flange 552B and the second web 554B.

In particular, in FIG. 5A, the second corner portion 558B and the fourth corner portion 558D each include the composite structure 100 shown in FIG. 1. Whereas, in FIG. 5B, the second corner portion 558B and the fourth corner portion 558D each include the composite structure 300 shown in FIG. 3. As shown in FIGS. 5A-5B, the composite structure 300 of FIG. 3, which includes the drop-off plies 318B having the tips 320 with tapered shapes arranged in the monotonically-inward pattern, provides a smoother and relatively more symmetric transition from the first gage 512A to the second gage 512B than the composite structure 100 of FIG. 1, which includes the drop-off plies 118B having the tips 120 with blunt-end shapes arranged in a cluster at or near the first outer surface 114.

As described above, FIGS. 5A-5B depict one example of a structure that can include the composite structures 100, 200, 300, 400 described herein. However, as described above, the composite structures 100, 200, 300, 400 can be incorporated in structures other than the composite stringers 550 shown in FIGS. 5A-5B.

Figure 6:
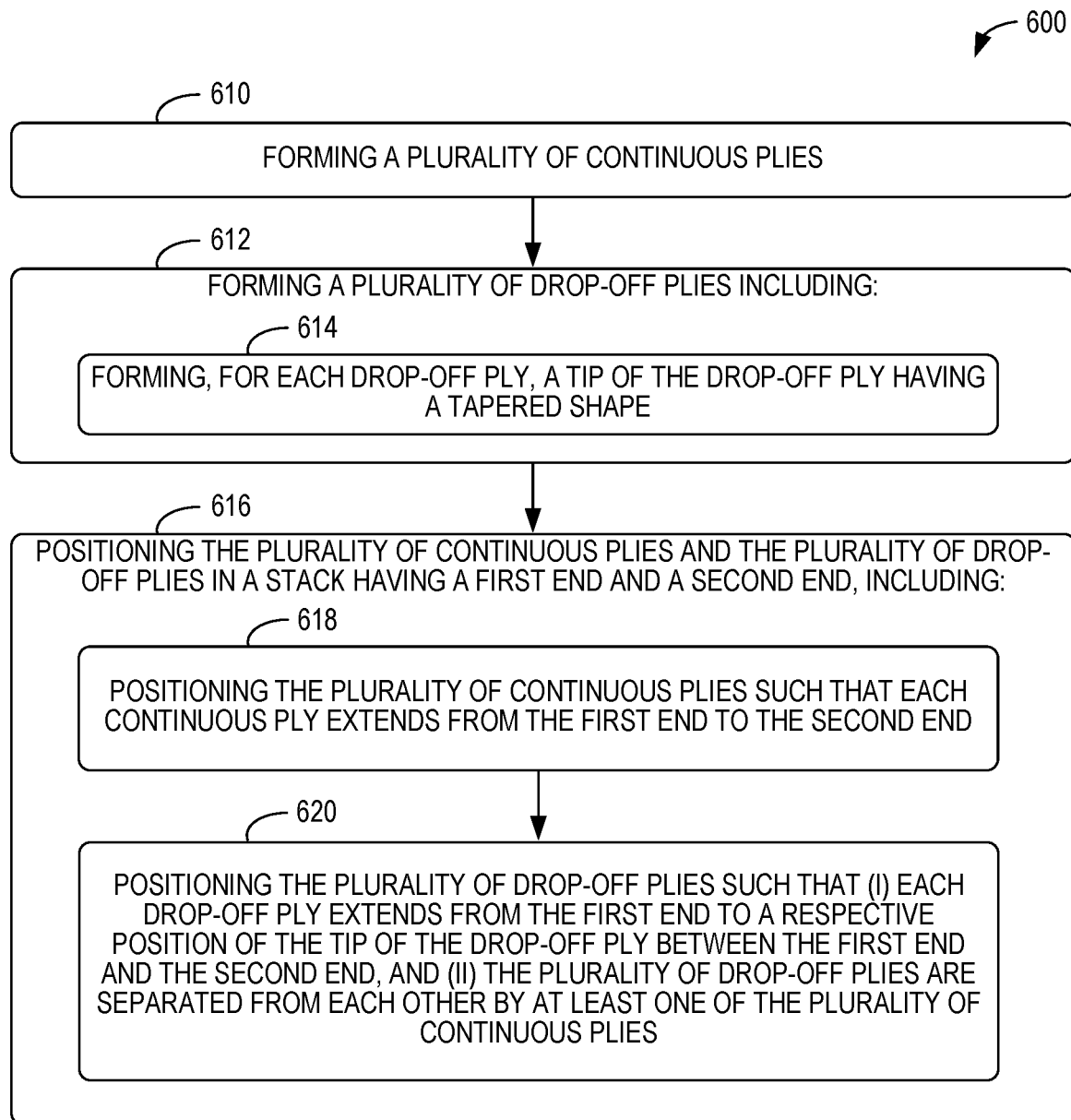
FIG. 6 illustrates a flow chart of an example process for forming a composite structure having a variable gage, according to an example.

Referring now to FIG. 6, a flowchart for a process 600 of forming a composite structure having a variable gage is described according to an example. As shown in FIG. 6, at block 610, the process 600 includes forming a plurality of continuous plies. At block 612, the process 600 includes forming a plurality of drop-off plies. Forming the plurality of drop-off plies at block 612 can include forming, for each drop-off ply, a tip of the drop-off ply having a tapered shape at block 612.

At block 616, the process 600 includes positioning the plurality of continuous plies and the plurality of drop-off plies in a stack having a first end and a second end. The first end has a first gage. The second end has a second gage, which is less than the first gage. As shown in FIG. 6, positioning the plurality of continuous plies and the plurality of drop-off plies at block 616 can include positioning the plurality of continuous plies such that each continuous ply extends from the first end to the second end at block 618. Positioning the plurality of continuous plies and the plurality of drop-off plies at block 616 can also include positioning the plurality of drop-off plies such that (i) each drop-off ply extends from the first end to a respective position of the tip of the drop-off ply between the first end and the second end, and (ii) the plurality of drop-off plies are separated from each other by at least one of the plurality of continuous plies at block 620.

Figure 7:
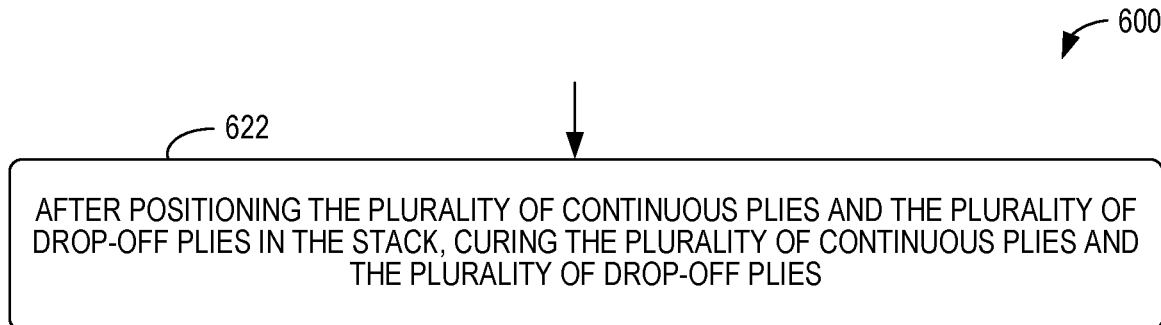
FIG. 7 illustrates a flow chart of an example process for forming a composite structure having a variable gage that can be used with the process shown in FIG. 6.

FIGS. 7-14 depict additional aspects of the process 600 according to further examples. As shown in FIG. 7, the process 600 can further include, after positioning the plurality of continuous plies and the plurality of drop-off plies in the stack at block 616, curing the plurality of continuous plies and the plurality of drop-off plies at block 622.

Figure 8:
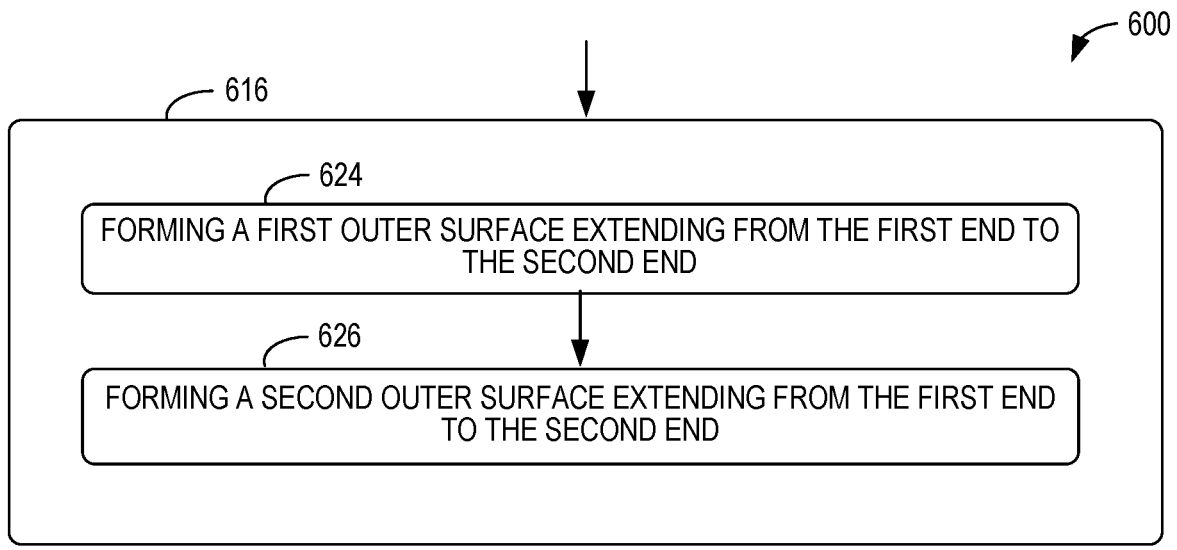
FIG. 8 illustrates a flow chart of an example process for forming a composite structure having a variable gage that can be used with the process shown in FIG. 6.

As shown in FIG. 8, positioning the plurality of continuous plies and the plurality of drop-off plies in the stack at block 616 can further include forming a first outer surface extending from the first end to the second end at block 624, and forming a second outer surface extending from the first end to the second end at block 626. The first gage and the second gage can be respective thicknesses between the first outer surface and the second outer surface at the first end and the second end, respectively.

Figure 9:
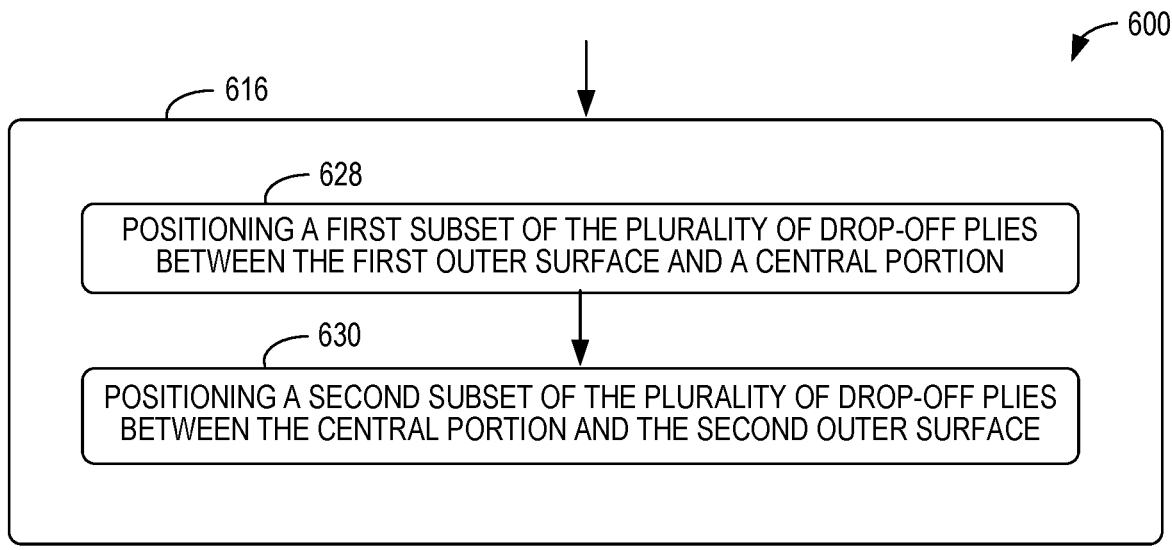
FIG. 9 illustrates a flow chart of an example process for forming a composite structure having a variable gage that can be used with the process shown in FIG. 8.

As shown in FIG. 9, positioning the plurality of continuous plies and the plurality of drop-off plies in the stack at block 616 can include positioning a first subset of the plurality of drop-off plies between the first outer surface and a central portion at block 628. The central portion (i) is between the first outer surface and the second outer surface and (ii) extends from the first end to the second end. Also, in FIG. 9, positioning the plurality of continuous plies and the plurality of drop-off plies in the stack at block 616 can include positioning a second subset of the plurality of drop-off plies between the central portion and the second outer surface at block 630.

Figure 10:
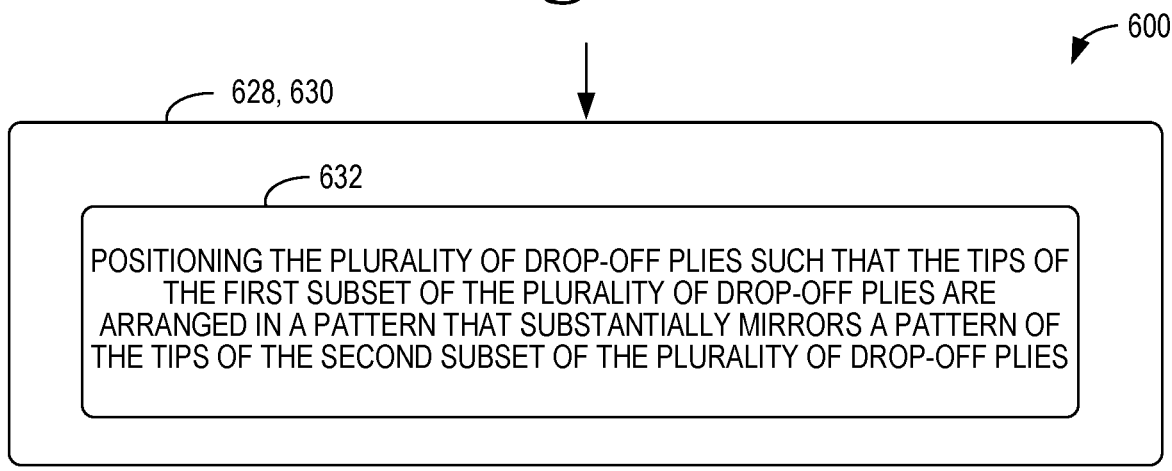
FIG. 10 illustrates a flow chart of an example process for forming a composite structure having a variable gage that can be used with the process shown in FIG. 9.

As shown in FIG. 10, positioning the first subset of the plurality of drop-off plies at block 628 and positioning the second subset of the plurality of drop-off plies at block 630 can include positioning the plurality of drop-off plies such that the tips of the first subset of the plurality of drop-off plies are arranged in a pattern that substantially mirrors a pattern of the tips of the second subset of the plurality of drop-off plies at block 632.

Figure 11:
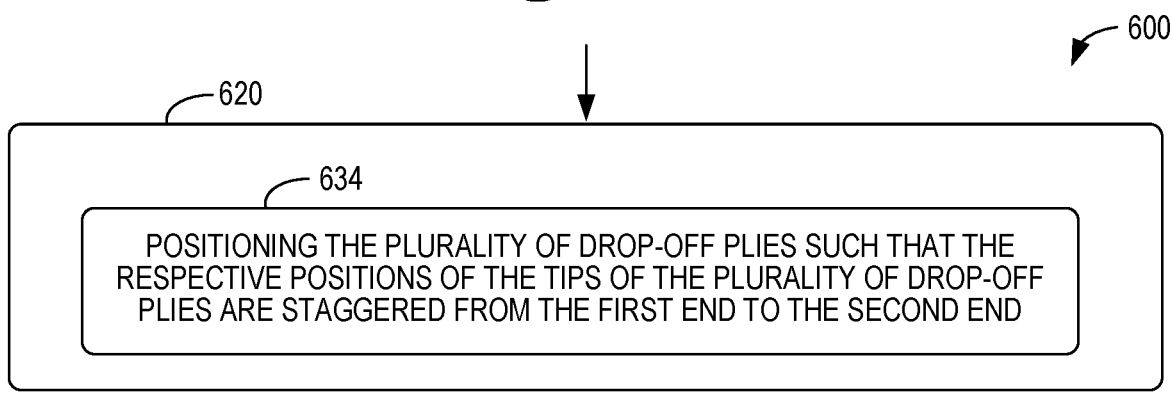
FIG. 11 illustrates a flow chart of an example process for forming a composite structure having a variable gage that can be used with the process shown in FIG. 9.

As shown in FIG. 11, positioning the plurality of drop-off plies at block 620 can include positioning the plurality of drop-off plies such that the respective positions of the tips of the plurality of drop-off plies are staggered from the first end to the second end at block 634.

Figure 12:
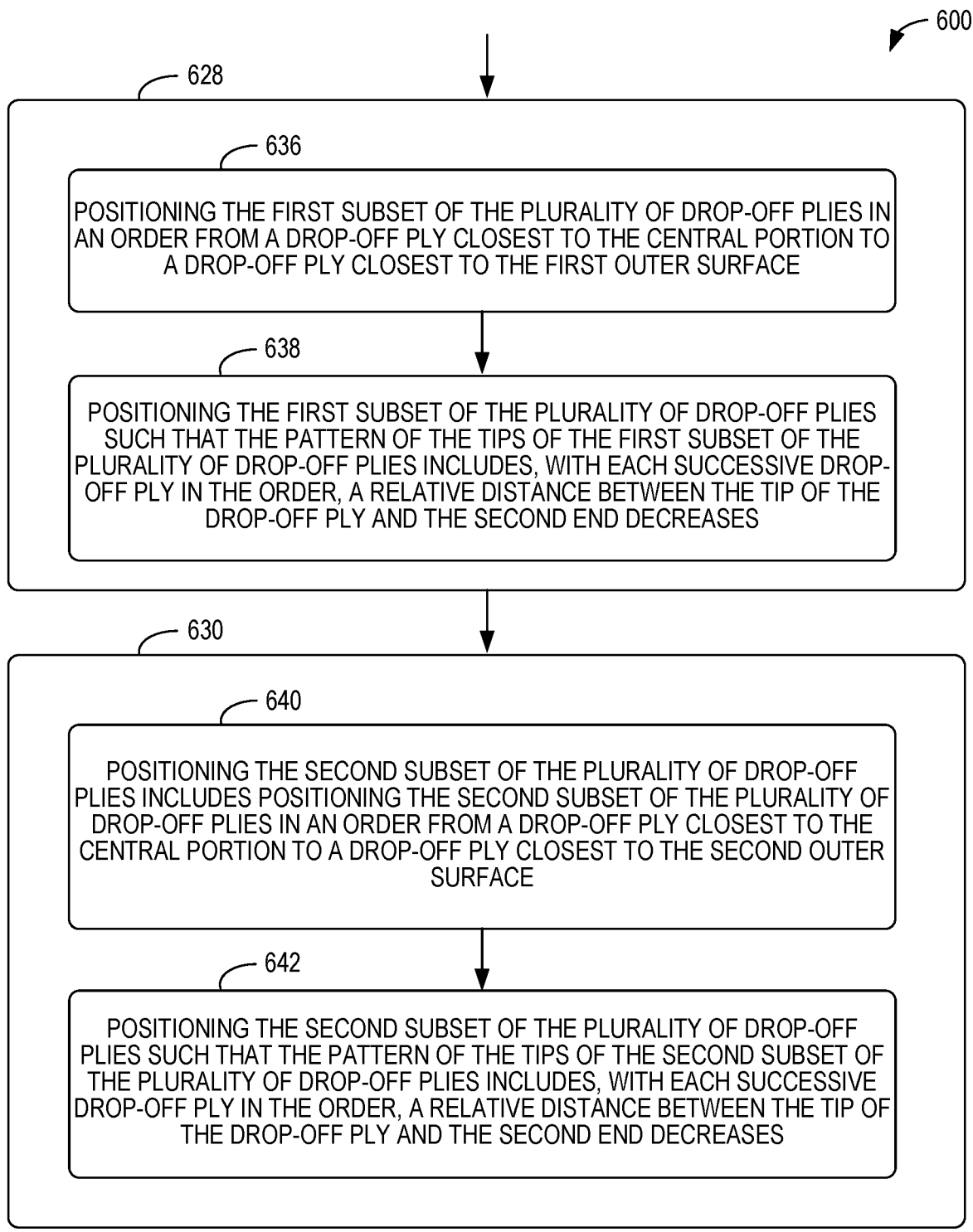
FIG. 12 illustrates a flow chart of an example process for forming a composite structure having a variable gage that can be used with the process shown in FIG. 11.

As shown in FIG. 12, positioning the first subset of the plurality of drop-off plies at block 628 can include (i) positioning the first subset of the plurality of drop-off plies in an order from a drop-off ply closest to the central portion to a drop-off ply closest to the first outer surface at block 636, and (ii) positioning the first subset of the plurality of drop-off plies such that the pattern of the tips of the first subset of the plurality of drop-off plies includes, with each successive drop-off ply in the order, a relative distance between the tip of the drop-off ply and the second end decreases at block 638.

Also, as shown in FIG. 12, positioning the second subset of the plurality of drop-off plies at block 630 can include (i) positioning the second subset of the plurality of drop-off plies includes positioning the second subset of the plurality of drop-off plies in an order from a drop-off ply closest to the central portion to a drop-off ply closest to the second outer surface at block 640, and (ii) positioning the second subset of the plurality of drop-off plies such that the pattern of the tips of the second subset of the plurality of drop-off plies includes, with each successive drop-off ply in the order, a relative distance between the tip of the drop-off ply and the second end decreases at block 642.

Figure 13:
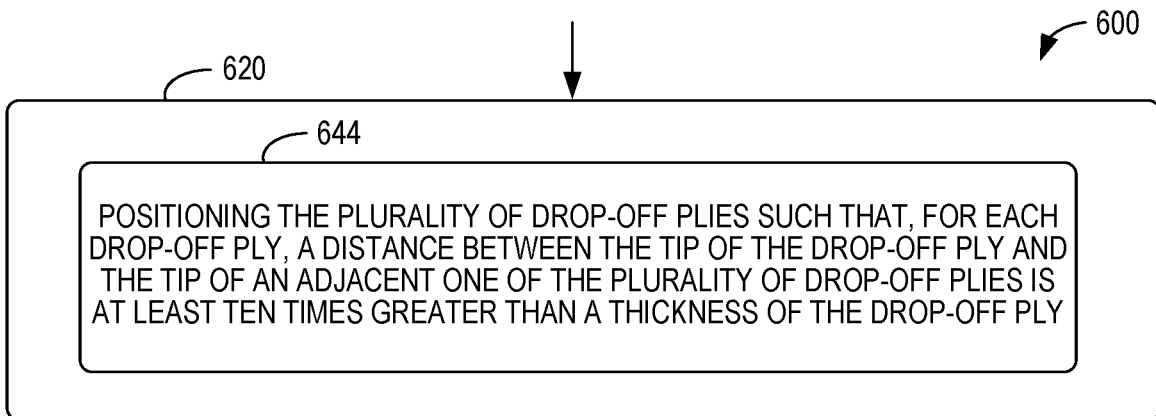
FIG. 13 illustrates a flow chart of an example process for forming a composite structure having a variable gage that can be used with the process shown in FIG. 6.

As shown in FIG. 13, positioning the plurality of drop-off plies at block 620 can include positioning the plurality of drop-off plies such that, for each drop-off ply, a distance between the tip of the drop-off ply and the tip of an adjacent one of the plurality of drop-off plies is at least ten times greater than a thickness of the drop-off ply at block 644. For each drop-off ply, the adjacent one of the plurality of drop-off plies is adjacent to the drop-off ply in a dimension extending between the first outer surface and the second outer surface.

Figure 14:
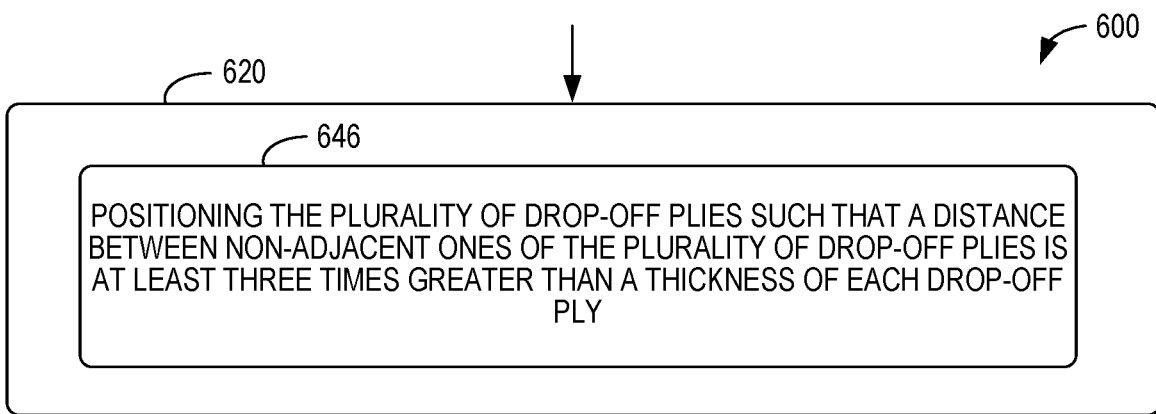
FIG. 14 illustrates a flow chart of an example process for forming a composite structure having a variable gage that can be used with the process shown in FIG. 6.

As shown in FIG. 14, positioning the plurality of drop-off plies at block 620 can include positioning the plurality of drop-off plies such that a distance between non-adjacent ones of the plurality of drop-off plies is at least three times greater than a thickness of each drop-off ply at block 646.

Figure 15:
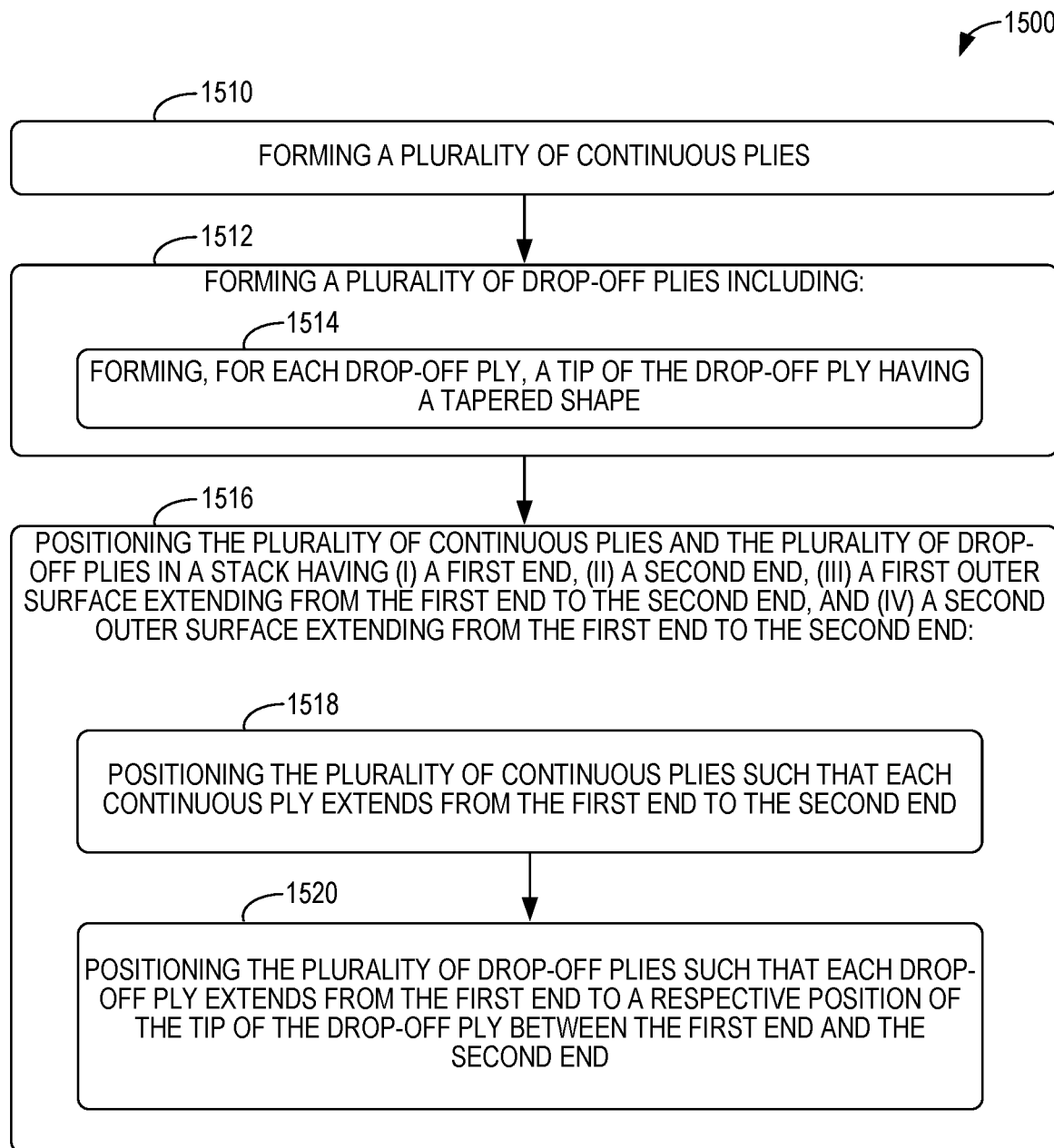
FIG. 15 illustrates a flow chart of an example process for forming a composite structure having a variable gage, according to an example.

Referring now to FIG. 15, a flowchart for a process 1500 of forming a composite structure having a variable gage is described according to an example. As shown in FIG. 15, at block 1510, the process 1500 includes forming a plurality of continuous plies. At block 1512, the process 1500 includes forming a plurality of drop-off plies. Forming the plurality of drop-off plies at block 1512 can include forming, for each drop-off ply, a tip of the drop-off ply having a tapered shape at block 1514.

At block 1516, the process 1500 can include positioning the plurality of continuous plies and the plurality of drop-off plies in a stack having (i) a first end, (ii) a second end, (iii) a first outer surface extending from the first end to the second end, and (iv) a second outer surface extending from the first end to the second end. The first end has a first gage. The second end has a second gage, which is less than the first gage.

In FIG. 15, positioning the plurality of continuous plies and the plurality of drop-off plies at block 1516 can include positioning the plurality of continuous plies such that each continuous ply extends from the first end to the second end at block 1518. Additionally, positioning the plurality of continuous plies and the plurality of drop-off plies at block 1516 can also include positioning the plurality of drop-off plies such that each drop-off ply extends from the first end to a respective position of the tip of the drop-off ply between the first end and the second end at block 1520. A first subset of the plurality of drop-off plies are between the first outer surface and a central portion of the stack and a second subset of the plurality of drop-off plies are between the central portion and the second outer surface.

Figure 16:
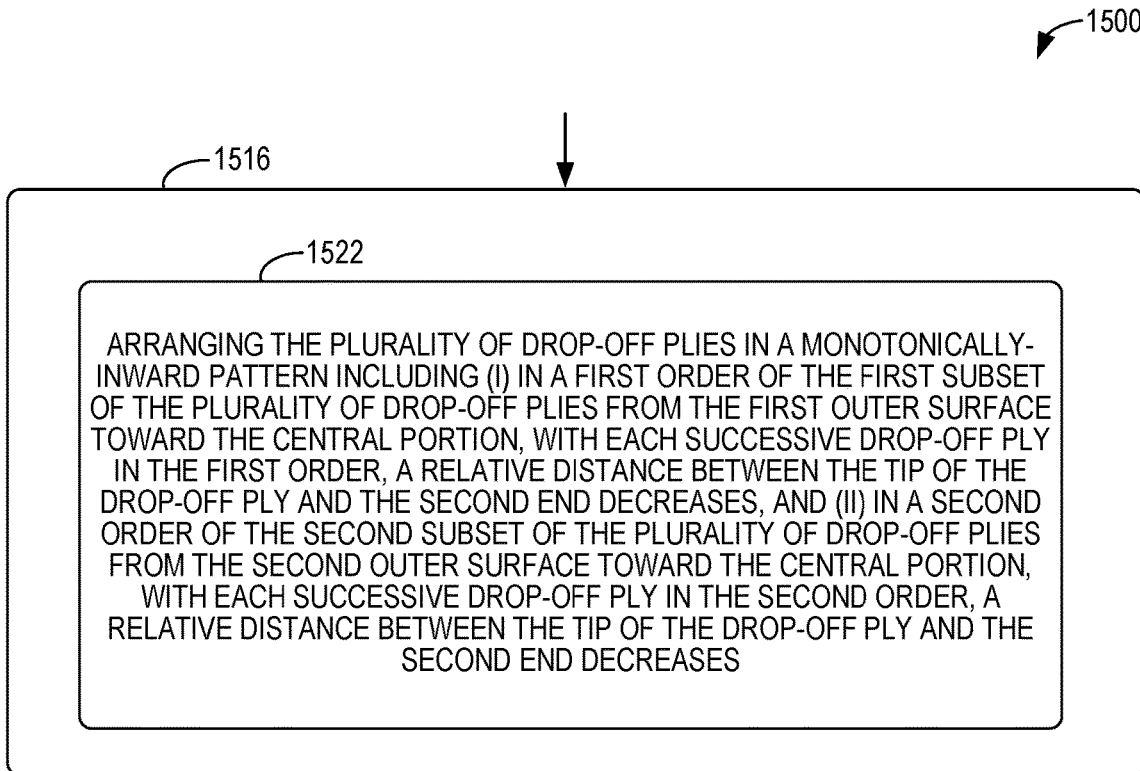
FIG. 16 illustrates a flow chart of an example process for forming a composite structure having a variable gage that can be used with the process shown in FIG. 15.

FIGS. 16-21 depict additional aspects of the process 1500 according to further examples. As shown in FIG. 16, positioning the plurality of continuous plies and the plurality of drop-off plies in the stack at block 1516 can further include, at block 1522, arranging the plurality of drop-off plies in a monotonically-inward pattern including (i) in a first order of the first subset of the plurality of drop-off plies from the first outer surface toward the central portion, with each successive drop-off ply in the first order, a relative distance between the tip of the drop-off ply and the second end decreases, and (ii) in a second order of the second subset of the plurality of drop-off plies from the second outer surface toward the central portion, with each successive drop-off ply in the second order, a relative distance between the tip of the drop-off ply and the second end decreases.

Figure 17:
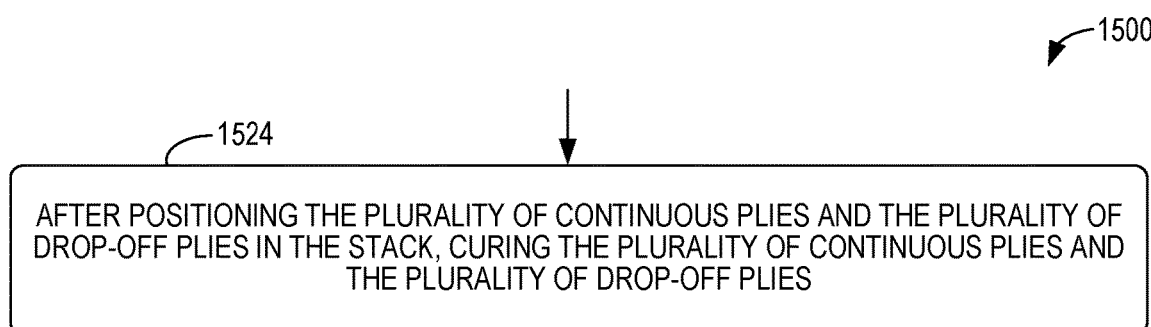
FIG. 17 illustrates a flow chart of an example process for forming a composite structure having a variable gage that can be used with the process shown in FIG. 16.

As shown in FIG. 17, after positioning the plurality of continuous plies and the plurality of drop-off plies in the stack at block 1516, the process 1500 can include curing the plurality of continuous plies and the plurality of drop-off plies at block 1524.

Figure 18:
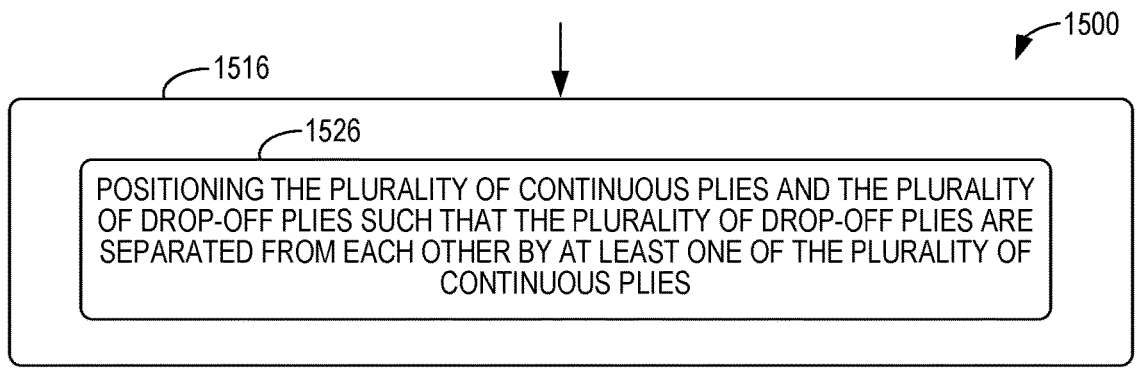
FIG. 18 illustrates a flow chart of an example process for forming a composite structure having a variable gage that can be used with the process shown in FIG. 16.

As shown in FIG. 18, positioning the plurality of continuous plies and the plurality of drop-off plies at block 1516 can include positioning the plurality of continuous plies and the plurality of drop-off plies such that the plurality of drop-off plies are separated from each other by at least one of the plurality of continuous plies at block 1526.

Figure 19:
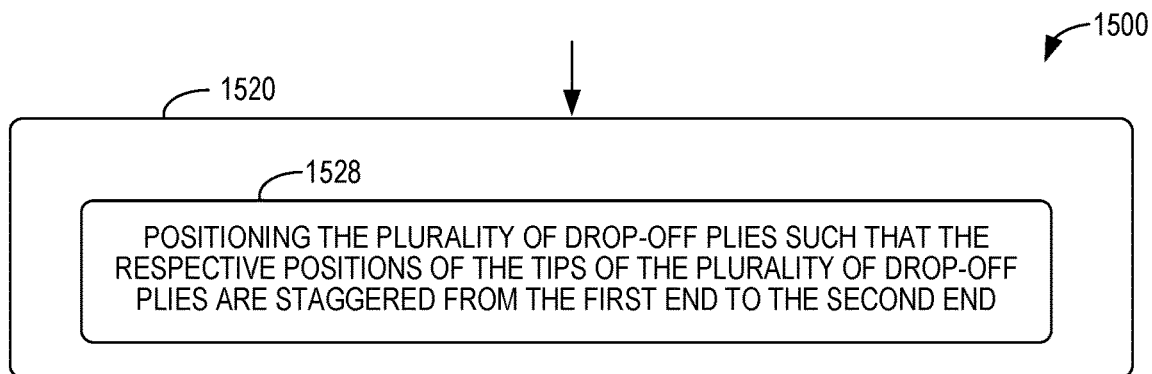
FIG. 19 illustrates a flow chart of an example process for forming a composite structure having a variable gage that can be used with the process shown in FIG. 16.

As shown in FIG. 19, positioning the plurality of drop-off plies at block 1520 can include positioning the plurality of drop-off plies such that the respective positions of the tips of the plurality of drop-off plies are staggered from the first end to the second end at block 1528.

Figure 20:
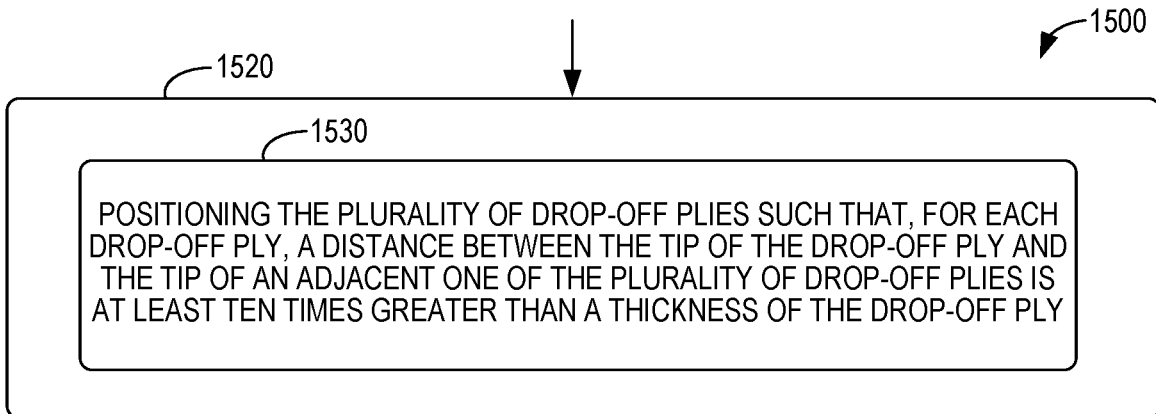
FIG. 20 illustrates a flow chart of an example process for forming a composite structure having a variable gage that can be used with the process shown in FIG. 16.

As shown in FIG. 20, positioning the plurality of drop-off plies at block 1520 can include positioning the plurality of drop-off plies such that, for each drop-off ply, a distance between the tip of the drop-off ply and the tip of an adjacent one of the plurality of drop-off plies is at least ten times greater than a thickness of the drop-off ply at block 1530. For each drop-off ply, the adjacent one of the plurality of drop-off plies is adjacent to the drop-off ply in a dimension extending between the first outer surface and the second outer surface.

Figure 21:
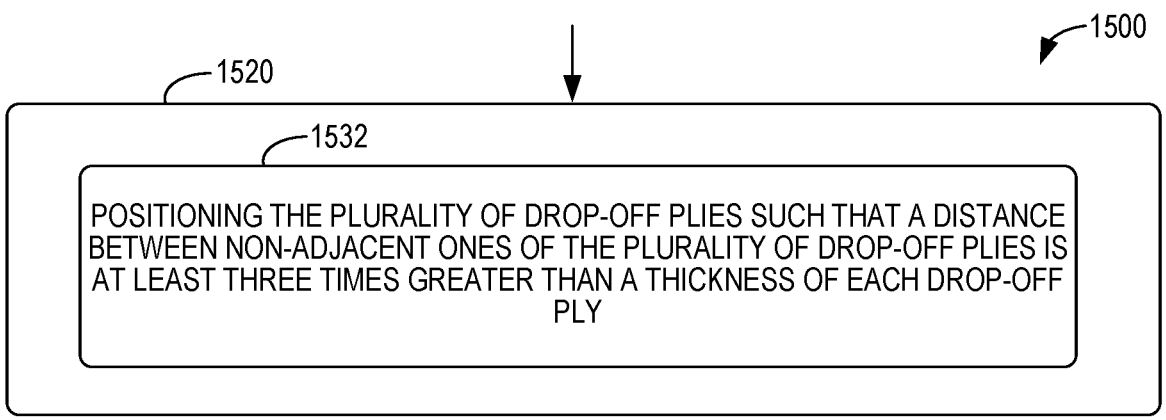
FIG. 21 illustrates a flow chart of an example process for forming a composite structure having a variable gage that can be used with the process shown in FIG. 16.

As shown in FIG. 21, positioning the plurality of drop-off plies at block 1520 can include positioning the plurality of drop-off plies such that a distance between non-adjacent ones of the plurality of drop-off plies is at least three times greater than a thickness of each drop-off ply at block 1532.

One or more of the blocks shown in FIGS. 6-21 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

Further, the disclosure comprises examples according to the following clauses:

Clause 1: A composite structure having a variable gage including a first end having a first gage, and a second end having a second gage, which is less than the first gage. The composite structure also includes a plurality of continuous plies and a plurality of drop-off plies. Each continuous ply extends from the first end to the second end. Each drop-off ply includes a tip having a tapered shape. Each drop-off ply extends from the first end to a respective position of the tip of the drop-off ply between the first end and the second end. The plurality of drop-off plies are separated from each other by at least one of the plurality of continuous plies.

Clause 2: The composite structure of Clause 1, further including a first outer surface extending from the first end to the second end, and a second outer surface extending from the first end to the second end. The plurality of continuous plies and the plurality of drop-off plies are arranged in a stack between the first outer surface and the second outer surface. The first gage and the second gage are respective thicknesses between the first outer surface and the second outer surface at the first end and the second end, respectively.

Clause 3: The composite structure of Clause 2, wherein a first subset of the plurality of drop-off plies are between the first outer surface and a central portion. The central portion (i) is between the first outer surface and the second outer surface and (ii) extends from the first end to the second end. A second subset of the plurality of drop-off plies are between the central portion and the second outer surface. The tips of the first subset of the plurality of drop-off plies are arranged in a pattern that substantially mirrors a pattern of the tips of the second subset of the plurality of drop-off plies.

Clause 4: The composite structure of Clause 3, wherein the central portion includes a single drop-off ply of the plurality of drop-off plies.

Clause 5: The composite structure of Clause 3, wherein the central portion includes two drop-off plies of the plurality of drop-off plies and at least one continuous ply of the plurality of continuous plies between the two drop-off plies.

Clause 6: The composite structure of any one of Clause 1-5, wherein the respective positions of the tips of the plurality of drop-off plies are staggered from the first end to the second end.

Clause 7: The composite structure of Clause 6, wherein the first subset of the plurality of drop-off plies are in an order from a drop-off ply closest to the central portion to a drop-off ply closest to the first outer surface. The pattern of the tips of the first subset of the plurality of drop-off plies includes, with each successive drop-off ply in the order, a relative distance between the tip of the drop-off ply and the second end decreases. The second subset of the plurality of drop-off plies are in an order from a drop-off ply closest to the central portion to a drop-off ply closest to the second outer surface. The pattern of the tips of the second subset of the plurality of drop-off plies includes, with each successive drop-off ply in the order, a relative distance between the tip of the drop-off ply and the second end decreases.

Clause 8: The composite structure of any one of Clause 2-7, wherein, for each drop-off ply, a distance between the tip of the drop-off ply and the tip of an adjacent one of the plurality of drop-off plies is at least ten times greater than a thickness of the drop-off ply. For each drop-off ply, the adjacent one of the plurality of drop-off plies is adjacent to the drop-off ply in a dimension extending between the first outer surface and the second outer surface.

Clause 9: The composite structure of any one of Clause 1-8, wherein, a distance between non-adjacent ones of the plurality of drop-off plies is at least three times greater than a thickness of each drop-off ply.

Clause 10: A method of forming a composite structure having a variable gage includes forming a plurality of continuous plies and forming a plurality of drop-off plies. Forming the plurality of drop-off plies includes forming, for each drop-off ply, a tip of the drop-off ply having a tapered shape. The method also includes positioning the plurality of continuous plies and the plurality of drop-off plies in a stack having a first end and a second end. The first end has a first gage. The second end has a second gage, which is less than the first gage. Positioning the plurality of continuous plies and the plurality of drop-off plies includes (a) positioning the plurality of continuous plies such that each continuous ply extends from the first end to the second end, and (b) positioning the plurality of drop-off plies such that (i) each drop-off ply extends from the first end to a respective position of the tip of the drop-off ply between the first end and the second end, and (ii) the plurality of drop-off plies are separated from each other by at least one of the plurality of continuous plies.

Clause 11: The method of Clause 10, further including, after positioning the plurality of continuous plies and the plurality of drop-off plies in the stack, curing the plurality of continuous plies and the plurality of drop-off plies.

Clause 12: The method of any one of Clauses 10-11, wherein positioning the plurality of continuous plies and the plurality of drop-off plies in the stack further includes forming a first outer surface extending from the first end to the second end, and forming a second outer surface extending from the first end to the second end. The first gage and the second gage are respective thicknesses between the first outer surface and the second outer surface at the first end and the second end, respectively.

Clause 13: The method of Clause 12, wherein positioning the plurality of continuous plies and the plurality of drop-off plies in the stack includes positioning a first subset of the plurality of drop-off plies between the first outer surface and a central portion, wherein the central portion (i) is between the first outer surface and the second outer surface and (ii) extends from the first end to the second end. Positioning the plurality of continuous plies and the plurality of drop-off plies in the stack also includes positioning a second subset of the plurality of drop-off plies between the central portion and the second outer surface. Positioning the first subset of the plurality of drop-off plies and positioning the second subset of the plurality of drop-off plies includes positioning the plurality of drop-off plies such that the tips of the first subset of the plurality of drop-off plies are arranged in a pattern that substantially mirrors a pattern of the tips of the second subset of the plurality of drop-off plies.

Clause 14: The method of Clause 13, wherein the central portion includes a single drop-off ply of the plurality of drop-off plies.

Clause 15: The method of Clause 13, wherein the central portion includes two drop-off plies of the plurality of drop-off plies and at least one continuous ply of the plurality of continuous plies between the two drop-off plies.

Clause 16: The method of any one of Clauses 10-15, wherein positioning the plurality of drop-off plies includes positioning the plurality of drop-off plies such that the respective positions of the tips of the plurality of drop-off plies are staggered from the first end to the second end.

Clause 17: The method of Clause 16, wherein positioning the first subset of the plurality of drop-off plies includes: (i) positioning the first subset of the plurality of drop-off plies in an order from a drop-off ply closest to the central portion to a drop-off ply closest to the first outer surface, and (ii) positioning the first subset of the plurality of drop-off plies such that the pattern of the tips of the first subset of the plurality of drop-off plies includes, with each successive drop-off ply in the order, a relative distance between the tip of the drop-off ply and the second end decreases. Positioning the second subset of the plurality of drop-off plies includes: (a) positioning the second subset of the plurality of drop-off plies includes positioning the second subset of the plurality of drop-off plies in an order from a drop-off ply closest to the central portion to a drop-off ply closest to the second outer surface, and (b) positioning the second subset of the plurality of drop-off plies such that the pattern of the tips of the second subset of the plurality of drop-off plies includes, with each successive drop-off ply in the order, a relative distance between the tip of the drop-off ply and the second end decreases.

Clause 18: The method of any one of Clauses 10-17, wherein positioning the plurality of drop-off plies includes positioning the plurality of drop-off plies such that, for each drop-off ply, a distance between the tip of the drop-off ply and the tip of an adjacent one of the plurality of drop-off plies is at least ten times greater than a thickness of the drop-off ply. For each drop-off ply, the adjacent one of the plurality of drop-off plies is adjacent to the drop-off ply in a dimension extending between the first outer surface and the second outer surface.

Clause 19: The method of any one of Clauses 10-18, wherein positioning the plurality of drop-off plies includes positioning the plurality of drop-off plies such that a distance between non-adjacent ones of the plurality of drop-off plies is at least three times greater than a thickness of each drop-off ply.

Clause 20: A composite structure having a variable gage. The composite structure includes a first segment having a first gage and a second segment having a second gage, which is less than the first gage. The composite structure also includes a transition segment between the first segment and the second segment. The transition segment includes a first end at the first segment and having the first gage, a second end at the second segment and having a second gage, a first outer surface extending from the first end to the second end, a second outer surface extending from the first end to the second end, and a plurality of plies (i) extending between the first end and the second end and (ii) arranged in a stack between the first outer surface and the second outer surface. The plurality of plies include (a) a plurality of continuous plies, wherein each continuous ply extends from the first end to the second end, and (b) at least one drop-off ply, wherein each drop-off ply comprises a tip having a tapered shape, wherein each drop-off ply extends from the first end to a respective position of the tip of the drop-off ply between the first end and the second end. Each drop-off ply is sandwiched between and abuts against a respective two continuous plies of the plurality of continuous plies.

Clause 21: A composite structure having a variable gage including a first end having a first gage, and a second end having a second gage, which is less than the first gage. The composite structure also includes a first outer surface extending from the first end to the second end, a second outer surface extending from the first end to the second end, and a plurality of plies (i) extending between the first end and the second end and (ii) arranged in a stack between the first outer surface and the second outer surface. The plurality of plies include a plurality of continuous plies and a plurality of drop-off plies. Each continuous ply extends from the first end to the second end. Each drop-off ply includes a tip having a tapered shape. Each drop-off ply extends from the first end to a respective position of the tip of the drop-off ply between the first end and the second end. A first subset of the plurality of drop-off plies are between the first outer surface and a central portion of the stack, and a second subset of the plurality of drop-off plies are between the central portion and the second outer surface. The tips of the plurality of drop-off plies are arranged in a monotonically-inward pattern including: (i) in a first order of the first subset of the plurality of drop-off plies from the first outer surface toward the central portion, with each successive drop-off ply in the first order, a relative distance between the tip of the drop-off ply and the second end decreases, and (ii) in a second order of the second subset of the plurality of drop-off plies from the second outer surface toward the central portion, with each successive drop-off ply in the second order, a relative distance between the tip of the drop-off ply and the second end decreases.

Clause 22: The composite structure of Clause 21, wherein the plurality of drop-off plies are separated from each other by at least one of the plurality of continuous plies.

Clause 23: The composite structure of any one of Clauses 21-22, wherein the first gage and the second gage are respective thicknesses between the first outer surface and the second outer surface at the first end and the second end, respectively.

Clause 24: The composite structure of any one of Clauses 21-23, wherein the central portion consists of at least one continuous ply of the plurality of continuous plies.

Clause 25: The composite structure of any one of Clauses 21-24, wherein the respective positions of the tips of the plurality of drop-off plies are staggered from the first end to the second end.

Clause 26: The composite structure of Clauses 21-25, wherein the monotonically-inward pattern further includes, along a direction from the first end to the second end, the tips of the first subset of the plurality of drop-off plies alternating with the tips of the second subset of the plurality of drop-off plies.

Clause 27: The composite structure of any one of Clauses 21-26, wherein the plurality of drop-off plies are arranged in a plurality of pairs of drop-off plies. Each pair of drop-off plies includes a respective one drop-off ply of the first subset and a respective one drop-off ply of the second subset. For each pair of drop-off plies, the respective one drop-off ply of the first subset and the respective one drop-off ply of the second subset are substantially equidistant from the central portion in a dimension between the first outer surface and the second outer surface.

Clause 28: The composite structure of any one of Clauses 21-27, wherein each drop-off ply has a ply angle, relative to a longitudinal axis of the composite structure, which is between approximately −30 degrees and +30 degrees.

Clause 29: The composite structure of Clause 28, wherein, for each pair, the ply angle is approximately the same for the plurality of drop-off plies of the pair.

Clause 30: The composite structure of any one of Clauses 21-29, wherein, for each drop-off ply, a distance between the tip of the drop-off ply and the tip of an adjacent one of the plurality of drop-off plies is at least ten times greater than a thickness of the drop-off ply. For each drop-off ply, the adjacent one of the plurality of drop-off plies is adjacent to the drop-off ply in a dimension extending between the first outer surface and the second outer surface.

Clause 31: The composite structure of any one of Clauses 21-30, wherein a distance between non-adjacent ones of the plurality of drop-off plies is at least three times greater than a thickness of each drop-off ply.

Clause 32: A method of forming a composite structure having a variable gage including forming a plurality of continuous plies and forming a plurality of drop-off plies. Forming the plurality of drop-off plies includes forming, for each drop-off ply, a tip of the drop-off ply having a tapered shape. The method also includes positioning the plurality of continuous plies and the plurality of drop-off plies in a stack having (i) a first end, (ii) a second end, (iii) a first outer surface extending from the first end to the second end, and (iv) a second outer surface extending from the first end to the second end. The first end has a first gage and the second end has a second gage, which is less than the first gage. Positioning the plurality of continuous plies and the plurality of drop-off plies includes positioning the plurality of continuous plies such that each continuous ply extends from the first end to the second end, and positioning the plurality of drop-off plies such that each drop-off ply extends from the first end to a respective position of the tip of the drop-off ply between the first end and the second end. A first subset of the plurality of drop-off plies are between the first outer surface and a central portion of the stack, and a second subset of the plurality of drop-off plies are between the central portion and the second outer surface. Positioning the plurality of continuous plies and the plurality of drop-off plies in the stack further includes arranging the plurality of drop-off plies in a monotonically-inward pattern including: (a) in a first order of the first subset of the plurality of drop-off plies from the first outer surface toward the central portion, with each successive drop-off ply in the first order, a relative distance between the tip of the drop-off ply and the second end decreases, and (b) in a second order of the second subset of the plurality of drop-off plies from the second outer surface toward the central portion, with each successive drop-off ply in the second order, a relative distance between the tip of the drop-off ply and the second end decreases.

Clause 33: The method of Clause 32, further including, after positioning the plurality of continuous plies and the plurality of drop-off plies in the stack, curing the plurality of continuous plies and the plurality of drop-off plies.

Clause 34: The method of any one of Clauses 32-33, wherein positioning the plurality of continuous plies and the plurality of drop-off plies includes positioning the plurality of continuous plies and the plurality of drop-off plies such that the plurality of drop-off plies are separated from each other by at least one of the plurality of continuous plies.

Clause 35: The method of any one of Clauses 32-34, wherein the central portion consists of at least one continuous ply of the plurality of continuous plies.

Clause 36: The method of any one of Clauses 32-35, wherein positioning the plurality of drop-off plies includes positioning the plurality of drop-off plies such that the respective positions of the tips of the plurality of drop-off plies are staggered from the first end to the second end.

Clause 37: The method of any one of Clauses 32-36, wherein positioning the plurality of drop-off plies includes positioning the plurality of drop-off plies such that, for each drop-off ply, a distance between the tip of the drop-off ply and the tip of an adjacent one of the plurality of drop-off plies is at least ten times greater than a thickness of the drop-off ply. For each drop-off ply, the adjacent one of the plurality of drop-off plies is adjacent to the drop-off ply in a dimension extending between the first outer surface and the second outer surface.

Clause 38: The method of any one of Clauses 32-37, wherein positioning the plurality of drop-off plies includes positioning the plurality of drop-off plies such that a distance between non-adjacent ones of the plurality of drop-off plies is at least three times greater than a thickness of each drop-off ply.

Clause 39: A composite structure having a variable gage. The composite structure includes a first segment having a first gage and a second segment having a second gage, which is less than the first gage. The composite structure also includes a transition segment between the first segment and the second segment. The transition segment includes a first end at the first segment and having the first gage, a second end at the second segment and having a second gage, a first outer surface extending from the first end to the second end, a second outer surface extending from the first end to the second end, and a plurality of plies (i) extending between the first end and the second end and (ii) arranged in a stack between the first outer surface and the second outer surface. The plurality of plies include a plurality of continuous plies and a plurality of drop-off plies. Each continuous ply extends from the first end to the second end. Each drop-off ply includes a tip having a tapered shape. Each drop-off ply extends from the first end to a respective position of the tip of the drop-off ply between the first end and the second end. A first subset of the plurality of drop-off plies are between the first outer surface and a central portion of the stack and a second subset of the plurality of drop-off plies are between the central portion and the second outer surface. The tips of the plurality of drop-off plies are arranged in a monotonically-inward pattern comprising: (a) in a first order of the first subset of the plurality of drop-off plies from the first outer surface toward the central portion, with each successive drop-off ply in the first order, a relative distance between the tip of the drop-off ply and the second end decreases, and (b) in a second order of the second subset of the plurality of drop-off plies from the second outer surface toward the central portion, with each successive drop-off ply in the second order, a relative distance between the tip of the drop-off ply and the second end decreases.

Clause 40: The composite structure of Clause 39, wherein the first segment is a flange of a composite stringer and the second segment is a web of the composite stringer.

Clause 41: A composite structure having a variable gage including a first end having a first gage, and a second end having a second gage, which is less than the first gage. The composite structure also includes a plurality of continuous plies and a plurality of drop-off plies. Each continuous ply extends from the first end to the second end. Each drop-off ply includes a tip having a blunt-end shape. Each drop-off ply extends from the first end to a respective position of the tip of the drop-off ply between the first end and the second end. The plurality of drop-off plies are separated from each other by at least one of the plurality of continuous plies.

Clause 42: The composite structure of Clause 41, further including a first outer surface extending from the first end to the second end, and a second outer surface extending from the first end to the second end. The plurality of continuous plies and the plurality of drop-off plies are arranged in a stack between the first outer surface and the second outer surface. The first gage and the second gage are respective thicknesses between the first outer surface and the second outer surface at the first end and the second end, respectively.

Clause 43: The composite structure of Clause 42, wherein a first subset of the plurality of drop-off plies are between the first outer surface and a central portion. The central portion (i) is between the first outer surface and the second outer surface and (ii) extends from the first end to the second end.

A second subset of the plurality of drop-off plies are between the central portion and the second outer surface. The tips of the first subset of the plurality of drop-off plies are arranged in a pattern that substantially mirrors a pattern of the tips of the second subset of the plurality of drop-off plies.

Clause 44: The composite structure of Clause 43, wherein the central portion includes a single drop-off ply of the plurality of drop-off plies.

Clause 45: The composite structure of Clause 43, wherein the central portion includes two drop-off plies of the plurality of drop-off plies and at least one continuous ply of the plurality of continuous plies between the two drop-off plies.

Clause 46: The composite structure of any one of Clause 41-45, wherein the respective positions of the tips of the plurality of drop-off plies are staggered from the first end to the second end.

Clause 47: The composite structure of Clause 46, wherein the first subset of the plurality of drop-off plies are in an order from a drop-off ply closest to the central portion to a drop-off ply closest to the first outer surface. The pattern of the tips of the first subset of the plurality of drop-off plies includes, with each successive drop-off ply in the order, a relative distance between the tip of the drop-off ply and the second end decreases. The second subset of the plurality of drop-off plies are in an order from a drop-off ply closest to the central portion to a drop-off ply closest to the second outer surface. The pattern of the tips of the second subset of the plurality of drop-off plies includes, with each successive drop-off ply in the order, a relative distance between the tip of the drop-off ply and the second end decreases.

Clause 48: The composite structure of any one of Clause 42-47, wherein, for each drop-off ply, a distance between the tip of the drop-off ply and the tip of an adjacent one of the plurality of drop-off plies is at least ten times greater than a thickness of the drop-off ply. For each drop-off ply, the adjacent one of the plurality of drop-off plies is adjacent to the drop-off ply in a dimension extending between the first outer surface and the second outer surface.

Clause 49: The composite structure of any one of Clause 41-48, wherein, a distance between non-adjacent ones of the plurality of drop-off plies is at least three times greater than a thickness of each drop-off ply.

Clause 50: A method of forming a composite structure having a variable gage includes forming a plurality of continuous plies and forming a plurality of drop-off plies. Forming the plurality of drop-off plies includes forming, for each drop-off ply, a tip of the drop-off ply having a blunt-end shape. The method also includes positioning the plurality of continuous plies and the plurality of drop-off plies in a stack having a first end and a second end. The first end has a first gage. The second end has a second gage, which is less than the first gage. Positioning the plurality of continuous plies and the plurality of drop-off plies includes (a) positioning the plurality of continuous plies such that each continuous ply extends from the first end to the second end, and (b) positioning the plurality of drop-off plies such that (i) each drop-off ply extends from the first end to a respective position of the tip of the drop-off ply between the first end and the second end, and (ii) the plurality of drop-off plies are separated from each other by at least one of the plurality of continuous plies.

Clause 51: The method of Clauses 50, further including, after positioning the plurality of continuous plies and the plurality of drop-off plies in the stack, curing the plurality of continuous plies and the plurality of drop-off plies.

Clause 52: The method of any one of Clauses 50-51, wherein positioning the plurality of continuous plies and the plurality of drop-off plies in the stack further includes forming a first outer surface extending from the first end to the second end, and forming a second outer surface extending from the first end to the second end. The first gage and the second gage are respective thicknesses between the first outer surface and the second outer surface at the first end and the second end, respectively.

Clause 53: The method of Clause 52, wherein positioning the plurality of continuous plies and the plurality of drop-off plies in the stack includes positioning a first subset of the plurality of drop-off plies between the first outer surface and a central portion, wherein the central portion (i) is between the first outer surface and the second outer surface and (ii) extends from the first end to the second end. Positioning the plurality of continuous plies and the plurality of drop-off plies in the stack also includes positioning a second subset of the plurality of drop-off plies between the central portion and the second outer surface. Positioning the first subset of the plurality of drop-off plies and positioning the second subset of the plurality of drop-off plies includes positioning the plurality of drop-off plies such that the tips of the first subset of the plurality of drop-off plies are arranged in a pattern that substantially mirrors a pattern of the tips of the second subset of the plurality of drop-off plies.

Clause 54: The method of Clause 53, wherein the central portion includes a single drop-off ply of the plurality of drop-off plies.

Clause 55: The method of Clause 53, wherein the central portion includes two drop-off plies of the plurality of drop-off plies and at least one continuous ply of the plurality of continuous plies between the two drop-off plies.

Clause 56: The method of any one of Clauses 50-55, wherein positioning the plurality of drop-off plies includes positioning the plurality of drop-off plies such that the respective positions of the tips of the plurality of drop-off plies are staggered from the first end to the second end.

Clause 57: The method of Clause 56, wherein positioning the first subset of the plurality of drop-off plies includes: (i) positioning the first subset of the plurality of drop-off plies in an order from a drop-off ply closest to the central portion to a drop-off ply closest to the first outer surface, and (ii) positioning the first subset of the plurality of drop-off plies such that the pattern of the tips of the first subset of the plurality of drop-off plies includes, with each successive drop-off ply in the order, a relative distance between the tip of the drop-off ply and the second end decreases. Positioning the second subset of the plurality of drop-off plies includes: (a) positioning the second subset of the plurality of drop-off plies includes positioning the second subset of the plurality of drop-off plies in an order from a drop-off ply closest to the central portion to a drop-off ply closest to the second outer surface, and (b) positioning the second subset of the plurality of drop-off plies such that the pattern of the tips of the second subset of the plurality of drop-off plies includes, with each successive drop-off ply in the order, a relative distance between the tip of the drop-off ply and the second end decreases.

Clause 58: The method of any one of Clauses 50-57, wherein positioning the plurality of drop-off plies includes positioning the plurality of drop-off plies such that, for each drop-off ply, a distance between the tip of the drop-off ply and the tip of an adjacent one of the plurality of drop-off plies is at least ten times greater than a thickness of the drop-off ply. For each drop-off ply, the adjacent one of the plurality of drop-off plies is adjacent to the drop-off ply in a dimension extending between the first outer surface and the second outer surface.

Clause 59: The method of any one of Clauses 50-58, wherein positioning the plurality of drop-off plies includes positioning the plurality of drop-off plies such that a distance between non-adjacent ones of the plurality of drop-off plies is at least three times greater than a thickness of each drop-off ply.

Clause 60: A composite structure having a variable gage. The composite structure includes a first segment having a first gage and a second segment having a second gage, which is less than the first gage. The composite structure also includes a transition segment between the first segment and the second segment. The transition segment includes a first end at the first segment and having the first gage, a second end at the second segment and having a second gage, a first outer surface extending from the first end to the second end, a second outer surface extending from the first end to the second end, and a plurality of plies (i) extending between the first end and the second end and (ii) arranged in a stack between the first outer surface and the second outer surface. The plurality of plies include (a) a plurality of continuous plies, wherein each continuous ply extends from the first end to the second end, and (b) at least one drop-off ply, wherein each drop-off ply comprises a tip having a blunt-end shape, wherein each drop-off ply extends from the first end to a respective position of the tip of the drop-off ply between the first end and the second end. Each drop-off ply is sandwiched between and abuts against a respective two continuous plies of the plurality of continuous plies.

Clause 61: A composite structure having a variable gage including a first end having a first gage, and a second end having a second gage, which is less than the first gage. The composite structure also includes a first outer surface extending from the first end to the second end, a second outer surface extending from the first end to the second end, and a plurality of plies (i) extending between the first end and the second end and (ii) arranged in a stack between the first outer surface and the second outer surface. The plurality of plies include a plurality of continuous plies and a plurality of drop-off plies. Each continuous ply extends from the first end to the second end. Each drop-off ply includes a tip having a blunt-end shape. Each drop-off ply extends from the first end to a respective position of the tip of the drop-off ply between the first end and the second end. A first subset of the plurality of drop-off plies are between the first outer surface and a central portion of the stack, and a second subset of the plurality of drop-off plies are between the central portion and the second outer surface. The tips of the plurality of drop-off plies are arranged in a monotonically-inward pattern including: (i) in a first order of the first subset of the plurality of drop-off plies from the first outer surface toward the central portion, with each successive drop-off ply in the first order, a relative distance between the tip of the drop-off ply and the second end decreases, and (ii) in a second order of the second subset of the plurality of drop-off plies from the second outer surface toward the central portion, with each successive drop-off ply in the second order, a relative distance between the tip of the drop-off ply and the second end decreases.

Clause 62: The composite structure of Clause 61, wherein the plurality of drop-off plies are separated from each other by at least one of the plurality of continuous plies.

Clause 63: The composite structure of any one of Clauses 61-62, wherein the first gage and the second gage are respective thicknesses between the first outer surface and the second outer surface at the first end and the second end, respectively.

Clause 64: The composite structure of any one of Clauses 61-63, wherein the central portion consists of at least one continuous ply of the plurality of continuous plies.

Clause 65: The composite structure of any one of Clauses 61-64, wherein the respective positions of the tips of the plurality of drop-off plies are staggered from the first end to the second end.

Clause 66: The composite structure of Clauses 61-65, wherein the monotonically-inward pattern further includes, along a direction from the first end to the second end, the tips of the first subset of the plurality of drop-off plies alternating with the tips of the second subset of the plurality of drop-off plies.

Clause 67: The composite structure of any one of Clauses 61-66, wherein the plurality of drop-off plies are arranged in a plurality of pairs of drop-off plies. Each pair of drop-off plies includes a respective one drop-off ply of the first subset and a respective one drop-off ply of the second subset. For each pair of drop-off plies, the respective one drop-off ply of the first subset and the respective one drop-off ply of the second subset are substantially equidistant from the central portion in a dimension between the first outer surface and the second outer surface.

Clause 68: The composite structure of any one of Clauses 61-67, wherein each drop-off ply has a ply angle, relative to a longitudinal axis of the composite structure, which is between approximately −30 degrees and +30 degrees.

Clause 69: The composite structure of Clause 68, wherein, for each pair, the ply angle is approximately the same for the plurality of drop-off plies of the pair.

Clause 70: The composite structure of any one of Clauses 61-69, wherein, for each drop-off ply, a distance between the tip of the drop-off ply and the tip of an adjacent one of the plurality of drop-off plies is at least ten times greater than a thickness of the drop-off ply. For each drop-off ply, the adjacent one of the plurality of drop-off plies is adjacent to the drop-off ply in a dimension extending between the first outer surface and the second outer surface.

Clause 71: The composite structure of any one of Clauses 61-70, wherein a distance between non-adjacent ones of the plurality of drop-off plies is at least three times greater than a thickness of each drop-off ply.

Clause 72: A method of forming a composite structure having a variable gage including forming a plurality of continuous plies and forming a plurality of drop-off plies. Forming the plurality of drop-off plies includes forming, for each drop-off ply, a tip of the drop-off ply having a blunt-end shape. The method also includes positioning the plurality of continuous plies and the plurality of drop-off plies in a stack having (i) a first end, (ii) a second end, (iii) a first outer surface extending from the first end to the second end, and (iv) a second outer surface extending from the first end to the second end. The first end has a first gage and the second end has a second gage, which is less than the first gage. Positioning the plurality of continuous plies and the plurality of drop-off plies includes positioning the plurality of continuous plies such that each continuous ply extends from the first end to the second end, and positioning the plurality of drop-off plies such that each drop-off ply extends from the first end to a respective position of the tip of the drop-off ply between the first end and the second end. A first subset of the plurality of drop-off plies are between the first outer surface and a central portion of the stack, and a second subset of the plurality of drop-off plies are between the central portion and the second outer surface. Positioning the plurality of continuous plies and the plurality of drop-off plies in the stack further includes arranging the plurality of drop-off plies in a monotonically-inward pattern including: (a) in a first order of the first subset of the plurality of drop-off plies from the first outer surface toward the central portion, with each successive drop-off ply in the first order, a relative distance between the tip of the drop-off ply and the second end decreases, and (b) in a second order of the second subset of the plurality of drop-off plies from the second outer surface toward the central portion, with each successive drop-off ply in the second order, a relative distance between the tip of the drop-off ply and the second end decreases.

Clause 73: The method of Clause 72, further including, after positioning the plurality of continuous plies and the plurality of drop-off plies in the stack, curing the plurality of continuous plies and the plurality of drop-off plies.

Clause 74: The method of any one of Clauses 72-73, wherein positioning the plurality of continuous plies and the plurality of drop-off plies includes positioning the plurality of continuous plies and the plurality of drop-off plies such that the plurality of drop-off plies are separated from each other by at least one of the plurality of continuous plies.

Clause 75: The method of any one of Clauses 72-74, wherein the central portion consists of at least one continuous ply of the plurality of continuous plies.

Clause 76: The method of any one of Clauses 72-75, wherein positioning the plurality of drop-off plies includes positioning the plurality of drop-off plies such that the respective positions of the tips of the plurality of drop-off plies are staggered from the first end to the second end.

Clause 77: The method of any one of Clauses 72-76, wherein positioning the plurality of drop-off plies includes positioning the plurality of drop-off plies such that, for each drop-off ply, a distance between the tip of the drop-off ply and the tip of an adjacent one of the plurality of drop-off plies is at least ten times greater than a thickness of the drop-off ply. For each drop-off ply, the adjacent one of the plurality of drop-off plies is adjacent to the drop-off ply in a dimension extending between the first outer surface and the second outer surface.

Clause 78: The method of any one of Clauses 72-77, wherein positioning the plurality of drop-off plies includes positioning the plurality of drop-off plies such that a distance between non-adjacent ones of the plurality of drop-off plies is at least three times greater than a thickness of each drop-off ply.

Clause 79: A composite structure having a variable gage. The composite structure includes a first segment having a first gage and a second segment having a second gage, which is less than the first gage. The composite structure also includes a transition segment between the first segment and the second segment. The transition segment includes a first end at the first segment and having the first gage, a second end at the second segment and having a second gage, a first outer surface extending from the first end to the second end, a second outer surface extending from the first end to the second end, and a plurality of plies (i) extending between the first end and the second end and (ii) arranged in a stack between the first outer surface and the second outer surface. The plurality of plies include a plurality of continuous plies and a plurality of drop-off plies. Each continuous ply extends from the first end to the second end. Each drop-off ply includes a tip having a blunt-end shape. Each drop-off ply extends from the first end to a respective position of the tip of the drop-off ply between the first end and the second end. A first subset of the plurality of drop-off plies are between the first outer surface and a central portion of the stack and a second subset of the plurality of drop-off plies are between the central portion and the second outer surface. The tips of the plurality of drop-off plies are arranged in a monotonically-inward pattern comprising: (a) in a first order of the first subset of the plurality of drop-off plies from the first outer surface toward the central portion, with each successive drop-off ply in the first order, a relative distance between the tip of the drop-off ply and the second end decreases, and (b) in a second order of the second subset of the plurality of drop-off plies from the second outer surface toward the central portion, with each successive drop-off ply in the second order, a relative distance between the tip of the drop-off ply and the second end decreases.

Clause 80: The composite structure of Clause 79, wherein the first segment is a flange of a composite stringer and the second segment is a web of the composite stringer.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A composite structure having a variable gage, comprising:
    a first end having a first gage;
    a second end having a second gage, which is less than the first gage;
    a plurality of continuous plies, wherein each continuous ply extends from the first end to the second end; and
    a plurality of drop-off plies, wherein each drop-off ply comprises a tip having a blunt-end shape, wherein each drop-off ply extends from the first end to a respective position of the tip of the drop-off ply between the first end and the second end,
    a first outer surface extending from the first end to the second end; and
    a second outer surface extending from the first end to the second end,
    wherein the plurality of drop-off plies are separated from each other by at least one of the plurality of continuous plies,
    wherein the plurality of continuous plies and the plurality of drop-off plies are arranged in a stack between the first outer surface and the second outer surface, and
    wherein the first gage and the second gage are respective thicknesses between the first outer surface and the second outer surface at the first end and the second end, respectively,
    wherein a first subset of the plurality of drop-off plies are between the first outer surface and a central portion,
    wherein the central portion (i) is between the first outer surface and the second outer surface and (ii) extends from the first end to the second end,
    wherein a second subset of the plurality of drop-off plies are between the central portion and the second outer surface, and
    wherein the tips of the first subset of the plurality of drop-off plies are arranged in a pattern that substantially mirrors a pattern of the tips of the second subset of the plurality of drop-off plies, wherein the central portion comprises a single drop-off ply of the plurality of drop-off plies, and wherein the respective position of the tip of the single drop-off ply is offset from the respective positions of the tips of the first subset of the plurality of drop-off plies and the respective positions of the tips of the second subset of the plurality of drop-off plies.

2. The composite structure of claim 1, wherein the respective positions of the tips of the plurality of drop-off plies of the first subset are staggered with the respective positions of the tips of the plurality of drop off plies of the second subset from the first end to the second end.

3. The composite structure of claim 2, wherein the first subset of the plurality of drop-off plies are in an order from a drop-off ply closest to the first outer surface to a drop-off ply closest to the central portion, wherein the pattern of the tips of the first subset of the plurality of drop-off plies comprises, with each successive drop-off ply in the order, a relative distance between the tip of the drop-off ply and the second end decreases, wherein the second subset of the plurality of drop-off plies are in an order from a drop-off ply closest to the second outer surface to a drop-off ply closest to the central portion, and wherein the pattern of the tips of the second subset of the plurality of drop-off plies comprises, with each successive drop-off ply in the order, a relative distance between the tip of the drop-off ply and the second end decreases.

4. The composite structure of claim 2, wherein the first subset of the plurality of drop-off plies are in an order from a drop-off ply closest to the central portion to a drop-off ply closest to the first outer surface, wherein the pattern of the tips of the first subset of the plurality of drop-off plies comprises, with each successive drop-off ply in the order, a relative distance between the tip of the drop-off ply and the second end decreases, wherein the second subset of the plurality of drop-off plies are in an order from a drop-off ply closest to the central portion to a drop-off ply closest to the second outer surface, and wherein the pattern of the tips of the second subset of the plurality of drop-off plies comprises, with each successive drop-off ply in the order, a relative distance between the tip of the drop-off ply and the second end decreases.

5. The composite structure of claim 1, wherein, for each drop-off ply, a distance between the tip of the drop-off ply and the tip of an adjacent one of the plurality of drop-off plies is at least ten times greater than a thickness of the drop-off ply, and wherein, for each drop-off ply, the adjacent one of the plurality of drop-off plies is adjacent to the drop-off ply in a dimension extending between the first outer surface and the second outer surface.

6. The composite structure of claim 1, wherein a distance between non-adjacent ones of the plurality of drop-off plies is at least three times greater than a thickness of each drop-off ply.

7. The composite structure of claim 1, wherein each drop-off ply has a ply angle, relative to a longitudinal axis of the composite structure, which is between approximately −30 degrees and +30 degrees.

8. A method of forming a composite structure having a variable gage, comprising:

forming a plurality of continuous plies;

forming a plurality of drop-off plies, wherein forming the plurality of drop-off plies comprises forming, for each drop-off ply, a tip of the drop-off ply having a blunt-end shape; and positioning the plurality of continuous plies and the plurality of drop-off plies in a stack having a first end and a second end, wherein the first end has a first gage, wherein the second end has a second gage, which is less than the first gage, wherein positioning the plurality of continuous plies and the plurality of drop-off plies comprises:

positioning the plurality of continuous plies such that each continuous ply extends from the first end to the second end, and positioning the plurality of drop-off plies such that (i) each drop-off ply extends from the first end to a respective position of the tip of the drop-off ply between the first end and the second end, and (ii) the plurality of drop-off plies are separated from each other by at least one of the plurality of continuous plies, wherein positioning the plurality of continuous plies and the plurality of drop-off plies in the stack further comprises:

forming a first outer surface extending from the first end to the second end; and forming a second outer surface extending from the first end to the second end, wherein the first gage and the second gage are respective thicknesses between the first outer surface and the second outer surface at the first end and the second end, respectively, wherein positioning the plurality of continuous plies and the plurality of drop-off plies in the stack further comprises:

positioning a first subset of the plurality of drop-off plies between the first outer surface and a central portion, wherein the central portion (i) is between the first outer surface and the second outer surface and (ii) extends from the first end to the second end, and positioning a second subset of the plurality of drop-off plies between the central portion and the second outer surface, wherein positioning the first subset of the plurality of drop-off plies and positioning the second subset of the plurality of drop-off plies comprises positioning the plurality of drop-off plies such that the tips of the first subset of the plurality of drop-off plies are arranged in a pattern that substantially mirrors a pattern of the tips of the second subset of the plurality of drop-off plies, wherein the central portion comprises a single drop-off ply of the plurality of drop-off plies, and wherein the respective position of the tip of the single drop-off ply is offset from the respective positions of the tips of the first subset of the plurality of drop-off plies and the respective positions of the tips of the second subset of the plurality of drop-off plies.

9. The method of claim 8, further comprising, after positioning the plurality of continuous plies and the plurality of drop-off plies in the stack, curing the plurality of continuous plies and the plurality of drop-off plies.

10. The method of claim 8, wherein positioning the plurality of drop-off plies comprises positioning the plurality of drop-off plies such that the respective positions of the tips of the plurality of drop-off plies of the first subset are staggered with the respective positions of the tips of the plurality of drop off plies of the second subset from the first end to the second end.

11. The method of claim 10, wherein positioning the first subset of the plurality of drop-off plies comprises:
   positioning the first subset of the plurality of drop-off plies in an order from a drop-off ply closest to the first outer surface to a drop-off ply closest to the central portion, and
   positioning the first subset of the plurality of drop-off plies such that the pattern of the tips of the first subset of the plurality of drop-off plies comprises, with each successive drop-off ply in the order, a relative distance between the tip of the drop-off ply and the second end decreases, and
wherein positioning the second subset of the plurality of drop-off plies comprises:
   positioning the second subset of the plurality of drop-off plies comprises positioning the second subset of the plurality of drop-off plies in an order from a drop-off ply closest to the second outer surface to a drop-off ply closest to the central portion, and
   positioning the second subset of the plurality of drop-off plies such that the pattern of the tips of the second subset of the plurality of drop-off plies comprises, with each successive drop-off ply in the order, a relative distance between the tip of the drop-off ply and the second end decreases.

12. The method of claim 10, wherein positioning the first subset of the plurality of drop-off plies comprises:
   positioning the first subset of the plurality of drop-off plies in an order from a drop-off ply closest to the central portion to a drop-off ply closest to the first outer surface, and
   positioning the first subset of the plurality of drop-off plies such that the pattern of the tips of the first subset of the plurality of drop-off plies comprises, with each successive drop-off ply in the order, a relative distance between the tip of the drop-off ply and the second end decreases, and
   wherein positioning the second subset of the plurality of drop-off plies comprises:
      positioning the second subset of the plurality of drop-off plies comprises
         positioning the second subset of the plurality of drop-off plies in an order from a drop-off ply closest to the central portion to a drop-off ply closest to the second outer surface, and
         positioning the second subset of the plurality of drop-off plies such that the pattern of the tips of the second subset of the plurality of drop-off plies comprises, with each successive drop-off ply in the order, a relative distance between the tip of the drop-off ply and the second end decreases.

13. The method of claim 8, wherein positioning the plurality of drop-off plies comprises positioning the plurality of drop-off plies such that, for each drop-off ply, a distance between the tip of the drop-off ply and the tip of an adjacent one of the plurality of drop-off plies is at least ten times greater than a thickness of the drop-off ply, and
   wherein, for each drop-off ply, the adjacent one of the plurality of drop-off plies is adjacent to the drop-off ply in a dimension extending between the first outer surface and the second outer surface.

14. The method of claim 8, wherein positioning the plurality of drop-off plies comprises positioning the plurality of drop-off plies such that a distance between non-adjacent ones of the plurality of drop-off plies is at least three times greater than a thickness of each drop-off ply.

15. A composite structure having a variable gage, comprising:
   a first segment having a first gage;
   a second segment having a second gage, which is less than the first gage; and
   a transition segment between the first segment and the second segment, wherein the transition segment comprises:
      a first end at the first segment and having the first gage,
      a second end at the second segment and having a second gage,
      a first outer surface extending from the first end to the second end,
      a second outer surface extending from the first end to the second end, and
      a plurality of plies (i) extending between the first end and the second end and (ii) arranged in a stack between the first outer surface and the second outer surface,
      wherein the plurality of plies comprise:
         (i) a plurality of continuous plies, wherein each continuous ply extends from the first end to the second end, and
         (ii) a plurality of drop-off plies, wherein each drop-off ply comprises a tip having a blunt-end shape, wherein each drop-off ply extends from the first end to a respective position of the tip of the drop-off ply between the first end and the second end,
      wherein each drop-off ply is sandwiched between and abuts against a respective two continuous plies of the plurality of continuous plies,
      wherein the first gage and the second gage are respective thicknesses between the first outer surface and the second outer surface at the first end and the second end, respectively,
      wherein a first subset of the plurality of drop-off plies are between the first outer surface and a central portion,
      wherein the central portion (i) is between the first outer surface and the second outer surface and (ii) extends from the first end to the second end,
      wherein a second subset of the plurality of drop-off plies are between the central portion and the second outer surface,
      wherein the tips of the first subset of the plurality of drop-off plies are arranged in a pattern that substantially mirrors a pattern of the tips of the second subset of the plurality of drop-off plies,
      wherein the central portion comprises a single drop-off ply of the plurality of drop-off plies, and
      wherein the respective position of the tip of the single drop-off ply is offset from the respective positions of the tips of the first subset of the plurality of drop-off plies and the respective positions of the tips of the second subset of the plurality of drop-off plies.

16. The composite structure of claim 15, wherein the respective positions of the tips of the plurality of drop-off plies of the first subset are staggered with the respective positions of the tips of the plurality of drop off plies of the second subset from the first end to the second end.

17. The composite structure of claim 16, wherein the first subset of the plurality of drop-off plies are in an order from a drop-off ply closest to the central portion to a drop-off ply closest to the first outer surface,
   wherein the pattern of the tips of the first subset of the plurality of drop-off plies comprises, with each successive drop-off ply in the order, a relative distance between the tip of the drop-off ply and the second end decreases,
   wherein the second subset of the plurality of drop-off plies are in an order from a drop-off ply closest to the central portion to a drop-off ply closest to the second outer surface, and
   wherein the pattern of the tips of the second subset of the plurality of drop-off plies comprises, with each successive drop-off ply in the order, a relative distance between the tip of the drop-off ply and the second end decreases.

18. The composite structure of claim 16, wherein the first subset of the plurality of drop-off plies are in an order from a drop-off ply closest to the first outer surface to a drop-off ply closest to the central portion,
   wherein the pattern of the tips of the first subset of the plurality of drop-off plies comprises, with each successive drop-off ply in the order, a relative distance between the tip of the drop-off ply and the second end decreases,
   wherein the second subset of the plurality of drop-off plies are in an order from a drop-off ply closest to the second outer surface to a drop-off ply closest to the central portion, and
   wherein the pattern of the tips of the second subset of the plurality of drop-off plies comprises, with each successive drop-off ply in the order, a relative distance between the tip of the drop-off ply and the second end decreases.

19. The composite structure of claim 15, wherein, for each drop-off ply, a distance between the tip of the drop-off ply and the tip of an adjacent one of the plurality of drop-off plies is at least ten times greater than a thickness of the drop-off ply, and
   wherein, for each drop-off ply, the adjacent one of the plurality of drop-off plies is adjacent to the drop-off ply in a dimension extending between the first outer surface and the second outer surface.

20. The composite structure of claim 15, wherein a distance between non-adjacent ones of the plurality of drop-off plies is at least three times greater than a thickness of each drop-off ply.

* * * * *